United States Patent [19]
Bauer et al.

[11] Patent Number: 6,067,354
[45] Date of Patent: May 23, 2000

[54] METHOD AND SYSTEM FOR PROCESSING DATA RECORDS FROM A TELEPHONE DATA REPOSITORY TO A RECEIVING SYSTEM

[75] Inventors: Deborah Bauer, Leesburg, Va.; Ross Edward Button, Ontario, Canada; Mike Cavanagh, Woodlawn, Canada; Susan Jane McQuigge Ernst, Gloucester, Canada; Kevin Germann, Gatineau, Canada; Ralph Holmes, Glenn Dale, Md.; Samuel S. Howlette, Great Falls, Va.; William Kalyn, Kanata, Canada; Steve Sauve, Orleans, Canada; Francis Cornelius Sommers, Ottawa, Canada

[73] Assignee: MCI Communications Corporation, Washington, D.C.

[21] Appl. No.: 09/169,466

[22] Filed: Oct. 9, 1998

Related U.S. Application Data

[63] Continuation of application No. 08/897,906, Jul. 21, 1997.

[51] Int. Cl.[7] .................................................. H04M 15/00
[52] U.S. Cl. .......................... 379/113; 379/112; 379/207; 379/265; 707/7; 707/523
[58] Field of Search .................................... 379/111, 112, 379/113, 115, 116, 119, 121, 126, 133, 134, 135, 196, 197, 207, 219, 265, 266; 707/1, 7, 10, 523

[56] References Cited

U.S. PATENT DOCUMENTS

| | | | |
|---|---|---|---|
| 5,218,632 | 6/1993 | Cool | 379/126 |
| 5,325,290 | 6/1994 | Cauffman et al. | 364/401 |
| 5,333,183 | 7/1994 | Herbert | 379/112 |
| 5,546,574 | 8/1996 | Grosskopf et al. | 395/600 |
| 5,566,235 | 10/1996 | Hetz | 379/201 |
| 5,606,600 | 2/1997 | Elliott et al. | 379/112 |
| 5,625,816 | 4/1997 | Burdick et al. | 395/614 |
| 5,703,939 | 12/1997 | Bushnell | 379/113 |
| 5,715,303 | 2/1998 | Marks et al. | 379/113 |
| 5,717,745 | 2/1998 | Vijay et al. | 379/112 |
| 5,734,705 | 3/1998 | Schlossman et al. | 379/117 |
| 5,757,895 | 5/1998 | Aridas et al. | 379/136 |
| 5,774,532 | 6/1998 | Gottlieb et al. | 379/11 |
| 5,784,443 | 7/1998 | Chapman et al. | 379/119 |
| 5,793,861 | 8/1998 | Haigh | 379/266 |
| 5,823,068 | 11/1998 | Smith | 379/113 |
| 5,835,497 | 11/1998 | Litzenberger et al. | 370/522 |
| 5,854,834 | 12/1998 | Gottieb et al. | 379/113 |
| 5,901,215 | 5/1999 | Dezonno | 379/266 |
| 5,910,983 | 6/1999 | Dezonno et al. | 379/266 |
| 5,933,489 | 8/1999 | Sensabaugh et al. | 379/219 |
| 5,951,654 | 9/1999 | Avsan et al. | 710/5 |

*Primary Examiner*—Curtis A. Kuntz
*Assistant Examiner*—Binh K. Tieu

[57] ABSTRACT

The present invention provides a method and system for processing data records from a telephone data repository to a receiving system having a message queue and a response queue. The method for processing data records comprising the steps of reading a response from the response queue and whenever the response is successfully read, processing the response. This step is then repeated until there are no more responses to be read. Next, a data record is retrieved from the telephone data repository and whenever the data record is successfully retrieved, the data record is formated into a message and putting the message in the message queue. This step is then repeated until a specified number of data records have been retrieved or there are no more data records to be retrieved. The system comprises a data processor, a first communications link connecting the data processor to a telephone data repository, a second communications link connecting the data processor to a message queue, and a third communications link connecting the data processor to a response queue. The data processor is configured to retrieve a data record from the telephone data repository via the first communications link, format the data record into a message and send the message to the message queue via the second communications link.

50 Claims, 19 Drawing Sheets

IBA Queue Disconnect Process (408)

IBA Queue Disconnect & Connect Process (638, 658, 708)

METHOD AND SYSTEM FOR PROCESSING DATA RECORDS FROM A TELEPHONE DATA REPOSITORY TO A RECEIVING SYSTEM

This is a continuation of application Ser. No. 08/897,906 filed Jul. 21, 1997 entitled "System and Method for Achieving Local Number Portability."

FIELD OF THE INVENTION

The present invention relates in general to the field of telecommunications and more specifically to a method and system for processing data records from a telephone data repository to a receiving system having a message queue and a response queue.

BACKGROUND OF THE INVENTION

Without limiting the invention, its background is described in connection with local telephone services and providers of such services. In general, the telecommunications industry has evolved into a highly competitive and sophisticated network of equipment manufacturers and service providers. Since the early 1980s, the industry has seen a shift from pure analog techniques over copper wire to digital techniques over optical fiber. Today, customers can choose from a large array of consumer telecommunications services including local and long distance calling, 800 and 900 calling accounts, TCP/IP (i.e. the "Internet") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may consume a host of numbers to accommodate a host of services. Thus, a common situation has evolved wherein a single customer will have a home number, an office number, a facsimile machine number, a cell phone number, an Internet account number and possibly others.

Today's service providers employ advanced information technology systems using sophisticated equipment such as routers, switches and digital cross-connects. At a minimum, the equipment must be configured to ensure calls reach their destination regardless of the service provider. While standards and communications protocols have been adopted by the industry, cooperation amongst service providers has been critical to implementing a reliable network. Today, a customer can place a clear noise free call from almost anywhere in the world.

The Public Switched Telephone Network ("PSTN") comprises the telecommunications backbone for most voice/data traffic in the world. For most local and long distance telephone calls a local telephone company acts as a local entry point to the PSTN. Typically, a Local Routing Number ("LRN") is used to route the call from a point of origination to a point of destination on the PSTN. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until the present invention, there was no way to port a customer s number from one service provider to another within the same local region.

In short, as competition for communications services has grown so has the value attached to a customer's telephone number. At present, call routing is based on a number associated with the switch used to handle the local call. Moreover, service providers have not developed a means for reliable call routing when a switch from one provider to another is made. Until the present invention, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan (Docket 94-0096 dated Apr. 7, 1995), to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Thus, a need exists for a system and method of achieving local number portability on a nationwide basis. A system and method of sharing a single telephone number over different local exchange carriers would fill a void not presently addressed by the prior art.

SUMMARY OF THE INVENTION

The present invention provides a method and system for processing data records from a telephone data repository to a receiving system having a message queue and a response queue. The method for processing data records comprising the steps of reading a response from the response queue and whenever the response is successfully read, processing the response. This step is then repeated until there are no more responses to be read. Next, a data record is retrieved from the telephone data repository and whenever the data record is successfully retrieved, the data record is formated into a message and putting the message in the message queue. This step is then repeated until a specified number of data records have been retrieved or there are no more data records to be retrieved.

The present invention also provides a method for processing data records from a telephone data repository to a receiving system having a message queue and a response queue. First, a response is read from the response queue and whenever the response is successfully read, the response is processed. This step is repeated until there are no more responses to be read. Whenever a specified amount of time has elapsed without invoking retrieving a data record, a previously sent data record is retrieved from the telephone data repository and whenever the previously sent data record is successfully retrieved, formatting the previously sent data record into a resend message and putting the resend message in the message queue. Whenever a specified number of previously sent data records have been retrieved, the response is read from the response queue and whenever the response is successfully read, the response is processed and removed from the response queue. This step is repeated until there are no more responses to be read. Moreover, the last three steps are repeated until there are no more previously sent data records to be retrieved. Next, a data record is retrieved from the telephone data repository and whenever the data record is successfully retrieved, the data record is formatted into a message and the message is put into the message queue. This step is repeated until a specified number of data records have been retrieved or there are no more data records to be retrieved. All these steps are then repeated until a terminate signal is received.

The present invention also provides a system comprises a data processor, a first communications link connecting the data processor to a telephone data repository, a second communications link connecting the data processor to a message queue, and a third communications link connecting the data processor to a response queue. The data processor is configured to retrieve a data record from the telephone data repository via the first communications link, format the data record into a message and send the message to the message queue via the second communications link.

The present invention thus provides a hardware and software platform to effect the porting of local telephone numbers from one service provider to another. The systems and subsystems of the invention are designed to communicate with a Number Portability Administration Center and Service Management System ("NPAC/SMS") which receives and stores updated customer routing information and makes it available to participating service providers. The NPAC/SMS contains a record of all ported numbers and a history file of all transactions relating to the porting of a number.

The present invention provides a system for Local Number Portability ("LNP") that submits service orders changes to a NPAC/SMS and administers the service provider subscription information relating to a particular customer A central or regionalized database is used to keep track of local numbers and the corresponding local service provider that services each number. Service providers interface with the database and obtain information at the telephone number level that permits individual providers to determine which carrier is providing service to which telephone number. A neutral third party maintains and administers the database allowing free access by any participating provider. Methods for transferring a customer's port data from an old service provider to a new service provider are also disclosed.

For a more complete understanding of the present invention, including its features and advantages, reference is now made to the following detailed description, taken in conjunction with the accompanying drawings.

BRIEF DESCRIPTION OF THE DRAWINGS

Corresponding numerals in the drawings refer to corresponding parts unless otherwise indicated.

DETAILED DESCRIPTION OF THE INVENTION

Throughout the following description, the terms "interface", "line", "lines", "link", "communications link", "inbound link" and/or "outbound link" can mean a channel, signal pathway, data path, circuit, or other similar mechanism whether physical, virtual or logical, which can be used for the transfer and communication of data by system applications and programs, whether external or internal. The terms "outbound link" and "inbound link" can also mean "pipes" in the context of the Oracle database structure and associated protocols, or "sockets" in the context of the Unix operating system structure and associated protocols. Such conventions are well known to those skilled in the art.

Figure 1:
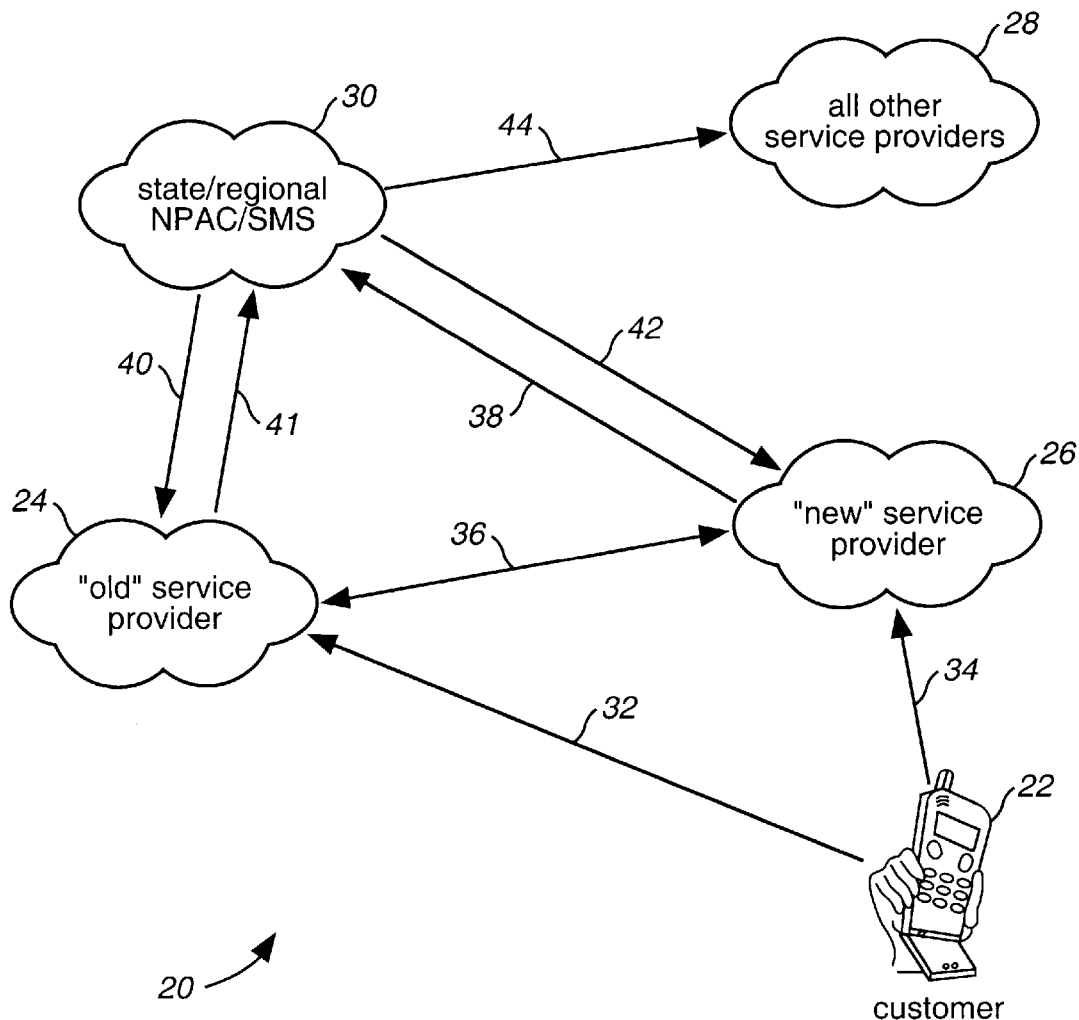
FIG. 1 is an overall process flow diagram for the method used to transfer a customers port data from an old service provider to a new service provider according to one embodiment of the invention.

Turning now to FIG. 1, a flow diagram of a telephone number porting process, denoted generally as 20, is shown. In general, the telephone number porting process 20, which achieves Local Number Portability ("LNP"), is used by a customer 22 to port or transfer his or her telephone number from an old service provider 24 to a new service provider 26. The customer 22 initiates the telephone number porting process 20 by submitting a port request to either the old service provider 24 as denoted by line 32, or the new service provider 26 as denoted by line 34, to arrange the port or transfer of the customer's telephone number from the old service provider 24 to the new service provider 26. Thereafter, the old service provider 24 and new service provider 26 arrange the port details for the customer's telephone number as denoted by line 36.

Once the new service provider 26 obtains the customer's port request, the new service provider 26 notifies a Number Portability Administration Center and Service Management System ("NPAC/SMS") 30, which maintains a centralized regional number database for all customers in a given region, of the pending port as denoted by line 38. Alternatively, the old service provider 24 can notify the NPAC/SMS 30 of the pending port as denoted by line 41.

When the NPAC/SMS 30 receives the notification it performs certain validation checks. If the NPAC/SMS 30 only received a notification from one of the involved service providers, either the old service provider 24 or the new service provider 26, will notify the service provider that failed to sent a notification that the NPAC/SMS 30 is expecting such a notification. If the NPAC/SMS 30 receives the missing notification and the notifications from the two service providers 24 and 26 indicate agreement, the NPAC/SMS 30 activates the port of the customer's telephone number when the new service provider due date is reached or the new service 26 provider sends and activation notice to the NPAC/SMS 30. The NPAC/SMS 30 activates the port of the customer's telephone number by sending the new port data to the old service provider 24 as denoted by line 40, the new service provider 26 as denoted by line 42, and all other service providers 28 as denoted by line 44. This ensures proper call routing to the customer because all the service providers in the region 24, 26, and 28 can update their networking equipment accordingly.

If during the validation process described above the old service provider 24 failed to respond, the NPAC/SMS 30 will log the failure to respond and allow the new service provider 26 to proceed with the port when the due date is reached. On the other hand, if it was the new service provider 26 that failed to respond, the NPAC/SMS 30 will log the failure to respond, cancel the notification and notify both service providers 24 and 26 of the cancellation. If there is any disagreement among any of the service providers 24, 26 or 28 as to who will provide the new service to the customer 22, the NPAC/SMS 30 will place the notification in a "conflict" state and notify the conflicting service providers 24, 26 or 28 of the conflict status. The conflicting service providers 24, 26 or 28 will determine who will serve the customer 22 using appropriate internal conflict resolution procedures. If the conflict is resolved, the NPAC/SMS 30 will remove the notification from the "conflict" once it is notified of the resolution and the process proceeds normally as described above. Alternatively, the new service provider 26 can cancel the port request.

The present invention incorporates significant advantages over the prior art in that it allows for the sending and receiving of porting data from regional databases, which are maintained at the NPAC/SMS 30, and provides a smooth transition from the old service provider 24 to the new service provider 26.

Figure 2:
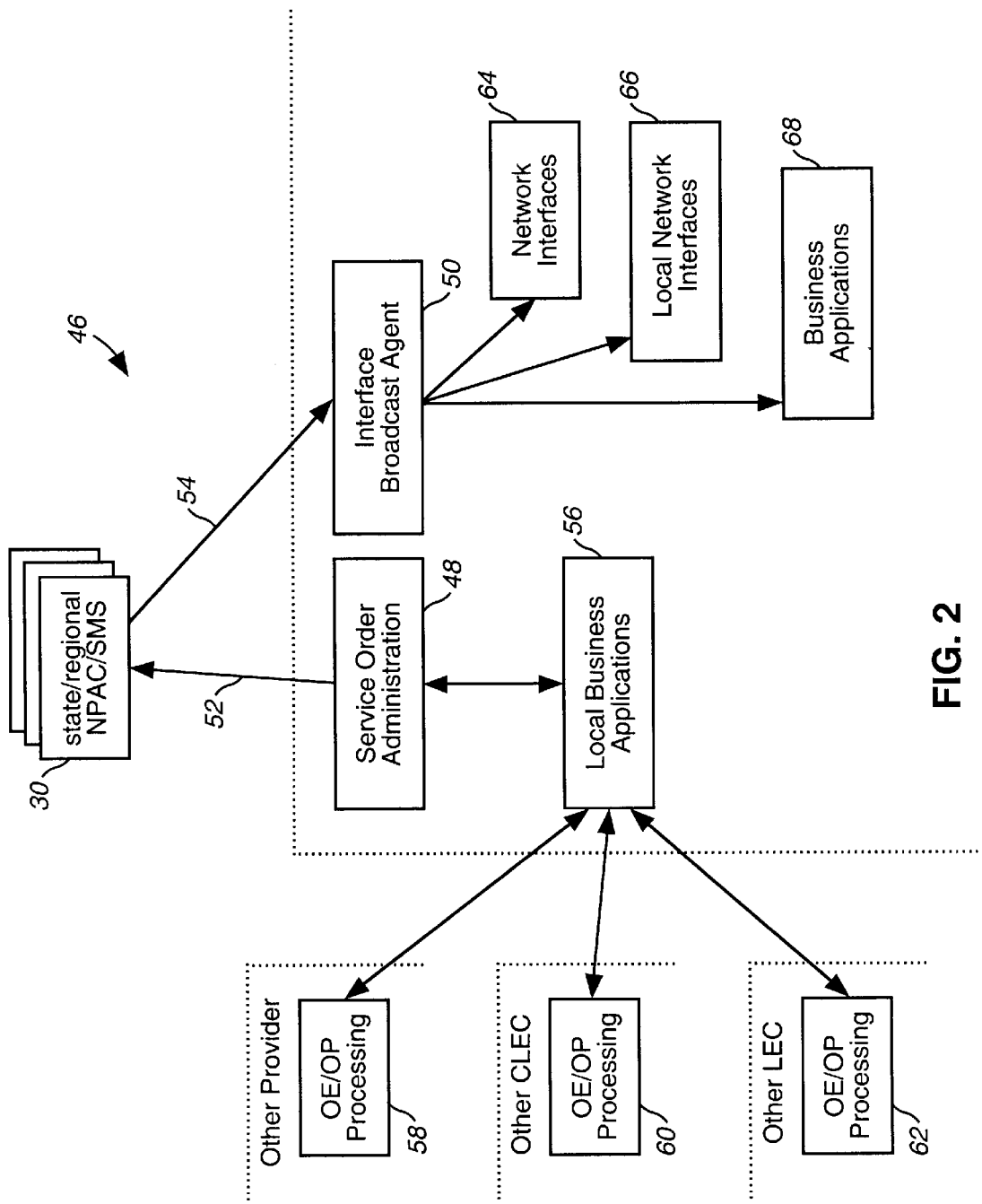
FIG. 2 is a high level block diagram for the interface between a Service Order Administration ("SOA"), an Interface Broadcast Agent ("IBA") and a regional number portability administration center according to one embodiment of the invention.

Turning now to FIG. 2, a block diagram of a system for achieving local number portability is shown and denoted generally as 46. The NPAC/SMS 30 is communicably linked to two functional subsystems, a Service Order Administration ("SOA") Subsystem 48 and an Interface Broadcast Agent ("IBA") Subsystem 50 via communication interfaces 52 and 54, respectively.

The SOA Subsystem 48 is the application responsible for sending the customer's port data from one service provider to another service provider. Likewise, the IBA Subsystem 50 is the application responsible for receiving, processing, storing and transmitting customer port data to the local networks. The SOA 48 and IBA 50 Subsystems work together with the NPAC/SMS 30 to send and receive customer porting data from regional call routing centers and data sources to more centralized information sources and applications. This configuration 46 provides a distributed architecture that allows the porting of data to the local applications and networking equipment maintained by service providers for appropriate call routing and processing.

The SOA Subsystem 48 is communicably linked to one or more local applications 56, which are maintained by the local service provider. Examples of the local applications 56 include, but are not limited to, residential and business lines for voice, data and fax communications. The local applications 56, in turn, are communicably linked and used by the customer Order Entry and Order Processing ("OE/OP") systems of other service providers 58, other Complex Local Exchange Carriers ("CLEC") 60, and other Local Exchange Carriers ("LEC") 62, depending on the existing network of service providers. The SOA Subsystem 48 acts as an intermediary between the local applications 56 and the NPAC/SMS 30, thus providing a smooth non-intrusive solution for local number portability.

Likewise, the IBA Subsystem 50 provides the interface between the regional NPAC/SMS 30 and a plurality of other network entry systems 64, 66 and 68. The specific functionality of the network entry systems 64, 66 and 68 may vary, but in general, they form a platform for receiving, storing, and routing customer port data. Examples of services that use the port data include local and long distances networks and 800 services.

For example, business applications 68 can comprise a database of records for all provider systems needing access to the customer porting data, such as the Automatic Number Identifier ("ANI") reference information system. The local network interfaces 66 can be an intelligent network architecture that supports routing queries during call processing. The network interface 64 can include the Metro Intelligent Network Architecture that forms a tie-in into available communications services. Such services may include an 800 or 900 service or other similar offerings that may require access to the port data through a regional toll switch network from the NPAC/SMS 30 for correct call servicing and routing.

Figure 3:
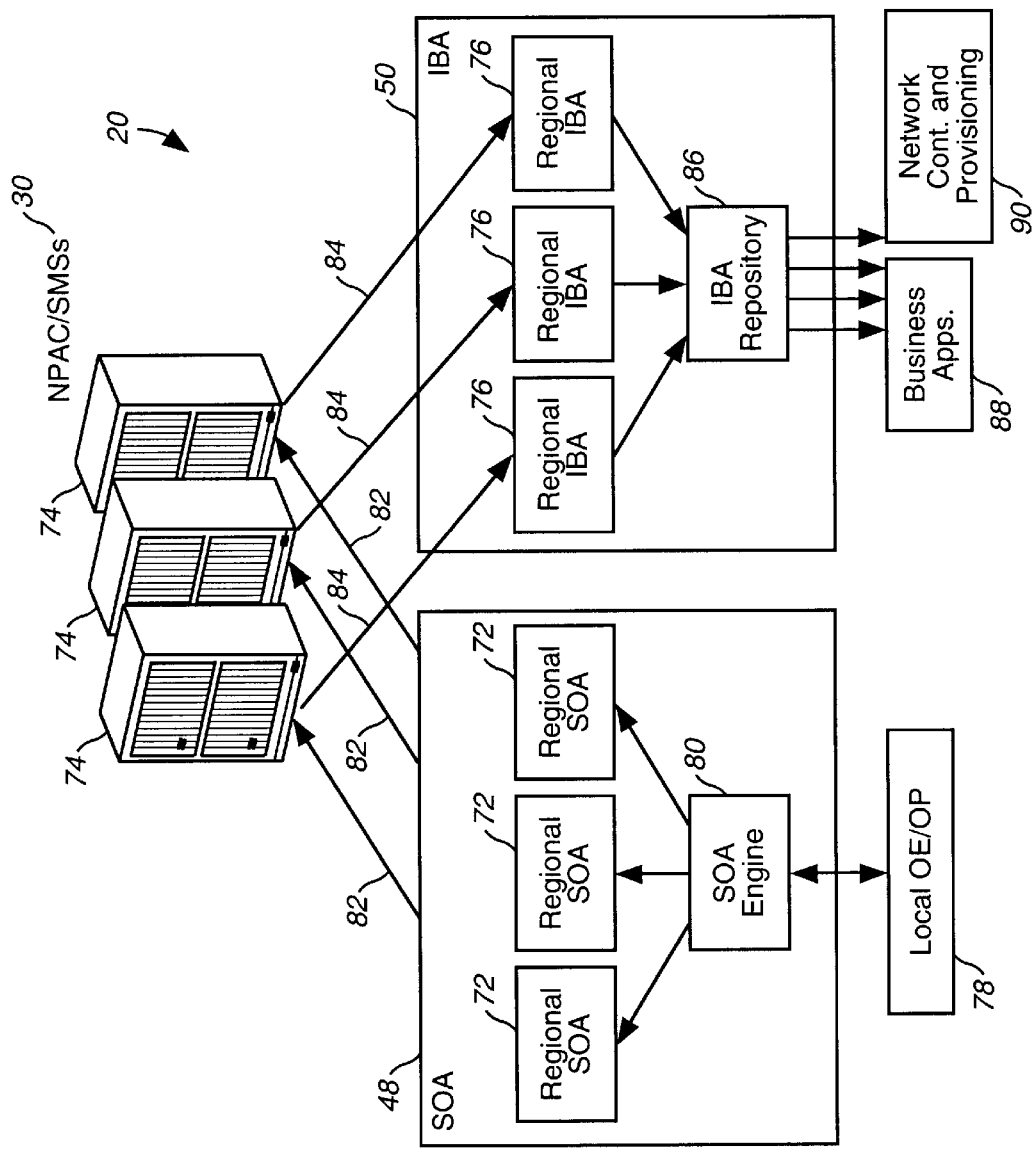
FIG. 3 is a block diagram of the SOA and IBA Subsystems and their interface to various business applications.
Figure 4:
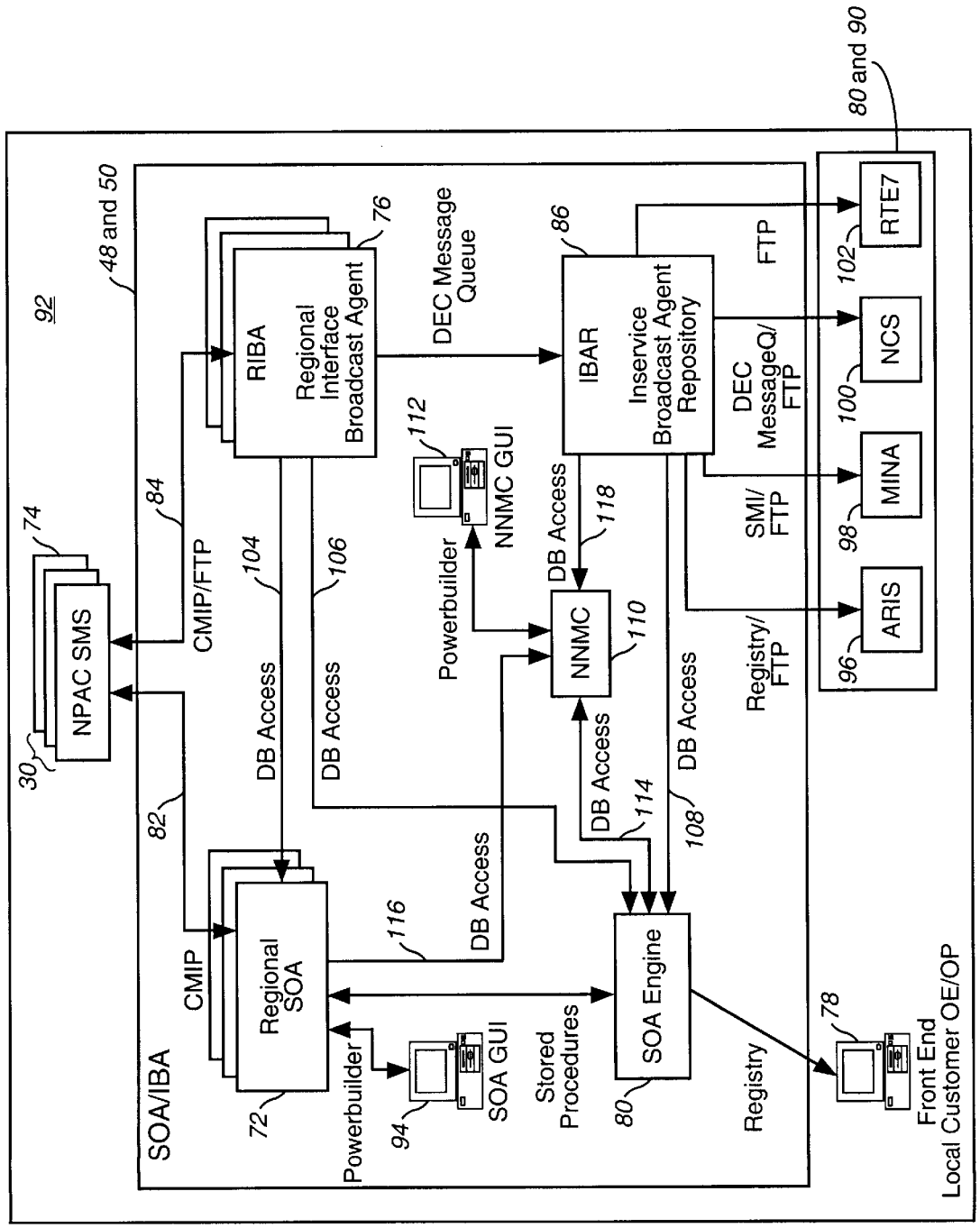
FIG. 4 is a block diagram of an alternative embodiment of the present invention with a National Network Management Center.

Turning now to FIGS. 3 and 4, the interaction between the NPAC/SMS 30, the SOA Subsystem 48 and the IBA Subsystem 50 will be described. The Local Number Portability System of FIG. 3 is denoted generally as 70, whereas the Local Number Portability System of FIG. 4 is denoted generally as 92. Local Customer Order Entry and Order Processing ("OE/OP") Systems (collectively referred to as the "Front End") 78 send and receive LNP transactions or messages to and from a local SOA Engine 80, which is an interface that routes the LNP transactions or messages to their appropriate destinations, such as the Regional SOA Subsystems 72 located in various parts of the country. In the case of FIG. 4, the SOA Engine 80 also receives and sends LNP transactions or messages from and to a SOA Graphical User Interface ("GUI") 94, and routes database queries to the RIBA 76 and IBAR 86 Subsystems. The Regional SOA 72 and SOA Engine 80 Subsystems form the SOA Subsystem 48, which provides the means for submitting customer service order changes to the Regional NPAC/SMSs 74.

Each Regional SOA Subsystem 72 is connected to a corresponding Regional NPAC/SMS 74 by communication interface 82, and all of the Regional NPAC/SMSs 74 form the NPAC/SMS 30. Similarly, each Regional NPAC/SMS 74 is connected to a corresponding RIBA Subsystem 76 by communication interface 84. Communication interfaces 82 and 84 conform to recognized industry standards, such as the North American Council Functional Requirements Specifications and the current version of the "NPAC/SMS Interoperable Interface Specification" by Lockheed Martin IMS Corporation. Communication interface 82 utilizes a Common Management Interface Protocol ("CMIP") and communication interface 84 utilizes both CMIP and File Transfer Protocols ("FTP").

Preferably some method of access control is provided to manage security issues that arise from communications between the SOA 32 and RIBA 34 Subsystems and the NPAC/SMS 74. In one embodiment, an access control field is included in messages flowing between the SOA 32 and RIBA 34 Subsystems and the NPAC/SMS 74 and carries a digital signature. As is known by those skilled in the art, a digital signature is used for authentication purposes to guarantee the identity of the message sender. For example, the access control field can include the following information:

System ID: An identifier for the system that is using the interface. This is a key element in the authentication process. While it is passed in each Protocol Data Unit, it is only really important in the association establishment.

System Type: Identifies the kind of system that is connecting: SOA, IBA, SOA and IBA or NPAC.

User Id: An optional field that passes a user Id used mostly for logging.

List Id: This is an integer that identifies the list from which a key was chosen to create the signature.

Key Id: This is an integer that identifies which key from the 1000 keys in a list was used to generate a signature.

CMIP Departure Time: This is the time at which a message was sent.

Sequence Number: This is 32 bit unsigned integer that starts at 0 and is incremented until wrapping at the maximum value.

Signature: The signature field contains the MD5 hashed and encrypted System Id, the System Type, the User Id, the CMIP Departure Time, and Sequence Number without separators between those fields or other additional characters. Encryption is done using RSA encryption using the key from the key list specified. Validation of this field ensures data integrity and non-repudiation of data.

Association Functions: These are set of flags that are set when an association is established.

Recovery Mode: The recovery mode flag is used to recover after downtime.

The NPAC/SMS 30 then relays the port data in a predefined message format to the IBA Subsystem 50 through interfaces 84. Like the SOA Subsystem 48, the IBA Subsystem 50 comprises a plurality of Regional IBA Subsystems 76 that update a single. IBAR Subsystem 86. As shown in FIG. 3, the IBAR Subsystem 86 is accessible by a plurality of downstream applications, such as business applications 88, and network provisioning and configuration systems 90. It should be understood, however, that any type of downstream system can be connected to the IBAR Subsystem 86 at the option of the service provider. In this way the porting data is distributed to existing network applications, such as long distance and local business, for proper call routing and processing. Similarly, FIG. 4 depicts the IBAR Subsystem 86 sending LNP data to four specific Request Processing Applications (88 and 90 of FIG. 3): an ANI Reference Information System ("ARIS") 96, Metro Intelligent Network Administration Service Management System ("MINA/SMS") 98, Network Control System ("NCS") 100 and Provisions Voice Network ("RTE7") 102.

Moreover, FIG. 4 depicts, several additional communication interfaces between the major subsystems of the LNP System 92: database access interface 104 between the Regional SOA 72 and RIBA 76 Subsystems; database access interface 106 between the RIBA 76 and SOA Engine 80 Subsystems; and database access interface 108 between the SOA Engine 80 and IBAR 86 Subsystem. A National Network Management Center ("NNMC") 110 is also shown.

The NNMC 110 is a stand-alone subsystem designed for basic querying of database information on the SOA 72 and IBAR 86 Subsystems. Accordingly, the NNMC 110 is connected through communication interfaces to the various databases in the LNP System 92: the SOA Engine Subsystem 80 through database access interface 114; the SOA Subsystem 72 through database access interface 116; and the IBAR Subsystem 86 through database access interface 118. An end-user can initiate a query using a NNMC GUI 112, which is connected to the NNMC 110. By entering a single telephone number and the database to query, either the SOA 126 (FIG. 5) or IBAR 172 (FIG. 7) Databases, an end-user can obtain such information as the LRN, effective date, service provider, action, status and telephone number range.

While FIGS. 3 and 4 depict the use of three (3) Regional SOA Subsystems 72, three (3) Regional NPAC/SMSs 74, and three (3) Regional IBA Subsystems 76, it is envisioned that each region providing local number portability, regardless of number, will have a corresponding SOA Subsystem 72, NPAC/SMS 74 and Regional IBA Subsystem 76. Moreover, while FIGS. 2, 3 and 4 illustrate various embodiments for achieving local number portability, it should be understood that other architectures may be similarly conceived and reduced to practice upon reference to this disclosure. It is anticipated therefore, that such other embodiments are well within the scope and spirit of the present invention. For example, FIGS. 5 through 8 disclose a detailed architectural design, in the form of block diagrams, for various subsystems that may be used to achieve local number portability in a preferred embodiment of the present invention.

Figure 5:
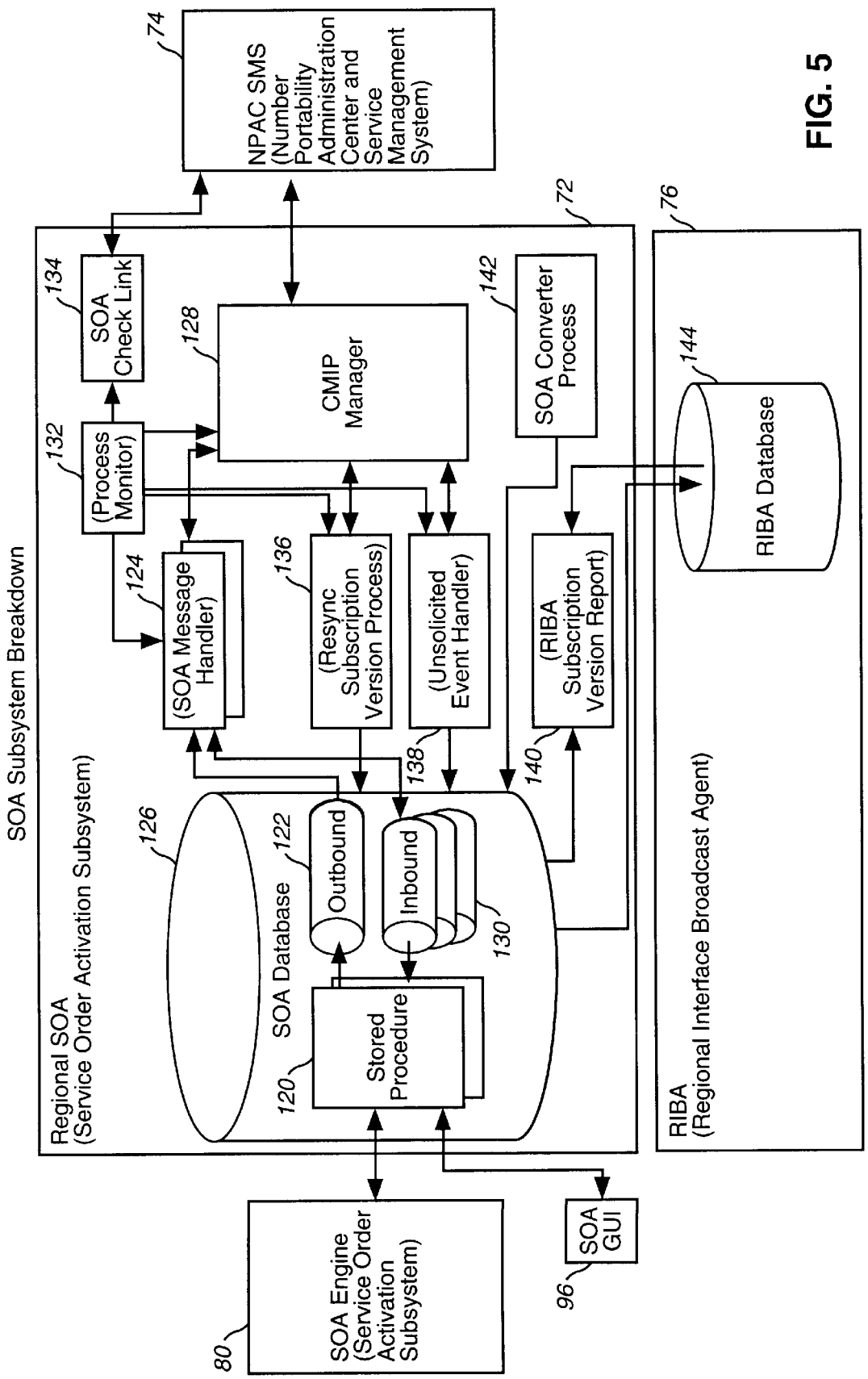
FIG. 5 is a block diagram of an SOA broken down into its component subsystems according to one embodiment.

Turning now to FIG. 5, the SOA Subsystem 72 is shown broken down into its functional components. LNP transactions, also referred to as messages or requests, originating either from the SOA Engine Subsystem 80 or an SOA GUI 94 are received through stored procedures 120, such as those used in an Oracle database structure. The stored procedures 120 send the message through a single outbound link 122 to a SOA Message Handler 124. Note that throughput can be increased by running multiple instances of the SOA Message Handler 124, each instance receiving messages from the single outbound link 122.

The SOA Message Handler 124 organizes and processes the messages by tasks that are preferably broken down at an object level, e.g., Subscription Version, Audit, Service Provider and Network. Based on a message identifier, the SOA Message Handler 124 queries the SOA Database 126 to collect and assemble any additional information required by the NPAC/SMS 74. The SOA Message Handler 124 then sends the message to the CMIP Manager 128, which is a distributed systems generator that implements the interface between the SOA Subsystem 72 and the NPAC/SMS 74, and waits for a response from the CMIP Manager 128, such as success, failure or timeout,. The CMIP Manager 128 then logs and sends the message to the NPAC/SMS 74.

When the CMIP Manager 128 receives a response from the NPAC/SMS 74, the response is routed to the SOA Message Handler 124, which processes any information received with the response and updates the SOA Database 81 when required. The SOA Message Handler 124 then sends the response through an inbound link 130 to the stored procedures 120 and out to the originating SOA Engine Subsystem 80 or SOA GUI 94. All output to the stored procedures 120 is done through separate inbound links 130, one for each SOA GUI 96.

The SOA Database 126 is used to store and maintain the current telephone number information for a customer. Table 1 below is domain field listing for an SOA Database 126 according to one embodiment:

TABLE 1

Domain List for one Embodiment of the SOA Database 126.

| Name | Code | Label | Type |
|---|---|---|---|
| BillingIdentifier | BILLING_ID | Billing Identifier | VARCHAR2(4) |
| BooleanIndicator | BOOL_IND | Boolean Indicator | NUMBER(1) |
| City | CITY | | VARCHAR2(20) |
| CLASS DPC | CLASS_DPC | | VARCHAR2(9) |
| CLASS SSN | CLASS_SSN | | NUMBER(3) |
| CNAM DPC | CNAM_DPC | | VARCHAR2(2) |
| CNAM SSN | CNAM_SSN | | NUMBER(3) |
| Contact Type | CONTACT_TYP | Contact Type | VARCHAR2(2) |
| Country | COUNTRY | | VARCHAR2(20) |
| EndUserLocationType | END_USER_LOC_TYPE | | VARCHAR2(2) |
| EndUserLocationValue | END_USER_LOC_VALUE | | VARCHAR2(12) |
| Identifier | ID | | NUMBER(10) |
| Identifier | ID2 | | NUMBER(10) |
| ISVM DPE | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| NPA NXX | NPA_NXX2 | NPA-NXX | VARCHAR2(6) |
| OperationAction | OPER_ACT | Opertaion Action | NUMBER(3) |
| Postal Code | PC | Postal Code | VARCHAR2(40) |
| ServProvID | SP_ID | | VARCHAR2(4) |
| ServProvID | SP_ID2 | | VARCHAR2(4) |
| StateProvince | STATE_PROV | State/Province | VARCHAR2(2) |
| Status | STATUS | Status Flag | NUMBER(10) |
| SystemType | SYSTEM_TYPE | | NUMBER(1) |
| TelephoneNumber | TN | Telephone Number | VARCHAR2(10) |
| Timestamp | T2 | | DATE |
| Timestamp | T | | DATE |
| TunableName | TUNABLE_NAME | Tunable Name | VARCHAR2(40) |
| TunableValue | TUNABLE_VALUE | Tunable Value | VARCHAR2(40) |
| UseIdentifier | USER_ID | | VARCHAR2(30) |
| Zip | ZIP | | VARCHAR2(9) |

The Process Monitor creates separate instances, SOA Process Monitor 132 and RIBA Process Monitor 167, which are the parent processes for the SOA 72 and RIBA 76 Subsystems and watch over all of the standard applications or processes required to run the Subsystems 72, 76. The SOA Process Monitor 132 and RIBA Process Monitor 167 keep a table of all applications or processes spawned and operational information about each application, such as the exit status of each application. The SOA Process Monitor 132 does not, however, monitor the IBA Subscription Version Report 140 or the SOA Converter Process 142. The SOA Process Monitor 132 starts applications when they are required and is notified if an application terminates. If an application, which is intended to always be running terminates, such as the CMIP Manager 128 and Check Link 134, the The SOA Process Monitor 132 will automatically restart the terminated application.

A Resynch Subscription Version Process 136 is coupled to the SOA Database 126 and it is used to synchronize the SOA Subsystem 72 after a period of downtime. The Resynch Subscription Version Process 136 is started after the CMIP Manager 128 binds to the NPAC/SMS 74. In operation, the Resynch Subscription Version Process 136 requests from the NPAC/SMS 74, by way of the CMIP Manager 128, all subscription versions that have a modification time-stamp more recent than the last time the CMIP Manager 128 had an association with the NPAC/SMS 74. The Resynch Subscription Version Process 136 also sets a downtime flag in an audit database table to indicate that an audit was ongoing during a period of downtime.

The CMIP Manager 128 also receives notifications from the NPAC/SMS 74. These notification transactions are sent to an Unsolicited Event Handler 138 which, in turn, processes the transactions and updates the SOA Database 126 when necessary. The Unsolicited Events Message Handler 138 waits for a message to be sent from the CMIP Manager 128. When the Unsolicited Events Message Handler 138 receives a message from the CMIP Manager 128, the Unsolicited Events Message Handler 138 determines the type of message and performs the required actions for that message type. When the action is complete, the Unsolicited Events Message Handler 138 formats and sends a reply to the CMIP Manager 128, which translates the message into a CMIP event and sends the event to NPAC/SMS 74.

The IBA Subscription Version Report 140, which is monitored and controlled by the operator, is used to report discrepancies between the SOA Database 126 and the RIBA Database 144, which is located in the Regional Interface Broadcast Agent ("RIBA") Subsystem 76. The Check Link 134 monitors the physical connection between the SOA Subsystem 72 and NPAC/SMS 74 so that if the physical connection is broken, the Check Link 134 will reset the SOA Subsystem 72.

The SOA Converter Process 142 is a stand-alone process for NPA-NXX Split processing that performs a conversion of the telephone number value in the SOA Subscription Version table. Using tunable database links, the SOA Converter Process 142 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the SOA Converter Process 142 performs a telephone number conversion. Each Subscription Version is retrieved from the SOA Database 126 to determine if the telephone number contains the old NPA-NXX. If so, the telephone number is modified to the new NPA-NXX. Other processes within the SOA Subsystem 72 continue processing during the conversion.

Figure 6:
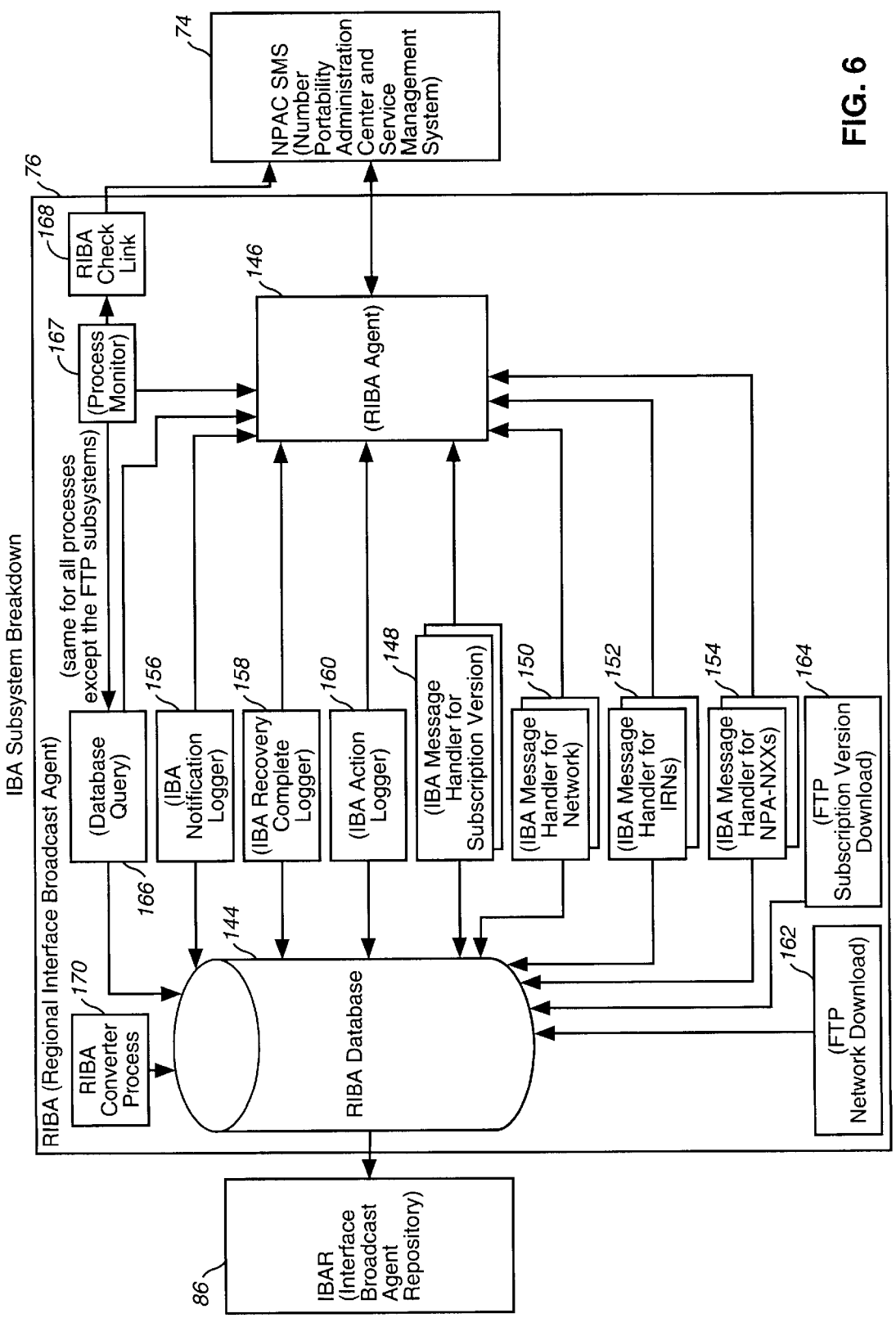
FIG. 6 is a block diagram of the IBA broken down into its component subsystems according to one embodiment.

Turning to FIG. 6, the Regional Interface Broadcast Agent ("RIBA") Subsystem 76 is broken down into its functional components. In general, the RIBA Subsystem 76 provides the interface between the NPAC/SMS 74 and the Interface Broadcast Agent Repository ("IBAR") Subsystem 86. When the NPAC/SMS 74 sends a message to the RIBA Subsystem 76, it is received by the RIBA Agent 146, which validates and strips the message of protocol related information. The RIBA Agent 146 then determines where the message is addressed to and sends the data to the appropriate application.

Messages from the NPAC/SMS 74 that request operations to be performed on tables within the RIBA Database 144, such as SET, CREATE and DELETE, are sent to RIBA Message Handlers. FIG. 6 illustrates the use of four (4) RIBA Message Handlers, each handling CMIP messages for a specific object type and performing updating operations on tables within the RIBA Database 144: a Subscription Version Message Handler 148; a Network Message Handler 150; a LRN Message Handler 152; and a NPA-NXX Message Handler 154. When the appropriate RIBA Message Handler, either 148, 150, 152 or 154, accepts the message, the data is then extracted from the message and the operation is determined. An SQL statement is built for the action using the data values extracted from the message. The SQL statement is then performed, which updates the RIBA Database 144.

The FTP Network Download 162 and FTP Subscription Version Download 164 applications can update or restore the RIBA Database 144 and IBAR Database 172 from the NPAC/SMS 74 via FTP/TCPIP. These FTP applications 162 and 164, which are controlled by an operator, read the subscription version and service provider network information from the NPAC/SMS 74 via FTP/TCPIP to form a flat file and update the appropriate database tables with the new information. These activities should be appropriately logged.

Upon startup, the IBA Agent 146 uses the Database Query process 166 to read each data item (subscription version, service provider network, LRN, and NPA-NXX information) from the RIBA Database 144 and loads them into memory. These data items form the Managed Instance Tree ("MIT"), which is used by the RIBA Subsystem 76 as reference points to the stored data during its operation. Once the load has been completed, the RIBA Agent 146 binds to the NPAC/SMS 74 and sends a download and recovery complete transaction to desynchronize the RIBA Subsystem 76. When the bind has been successfully established, the RIBA Agent 146 requests that the NPAC/SMS 74 download all of the subscription, NPA-N=and LRN data which was accumulated during the time that the IBA Agent 146 was not bound to the NPAC/SMS 74. Upon successful completion of the download, the RIBA Agent 146 informs the NPAC/SMS 74 that the download has been completed and normal processing resumes.

The RIBA Agent 146 also receives notification, recovery complete and action transactions, which are forwarded to the appropriate logging utilities: a Notification Logger 156; a Recovery Complete Logger 158; and an Action Logger 160. These logging utilities, 156, 158 and 160, perform actions that are common to the RIBA log and notification programs. These procedures are contained in a separate program file and linked with the log and notification programs. When changes are required in the utility functions, these changes only need to be made in one place and the programs recompiled. These utilities process and handle the transactions and update the RIBA Database 144.

In use, the NPAC/SMS 74 sends variable length create requests to the RIBA Agent 146 consisting of subscription data and a list of one or more telephone numbers for each subscription data element. The RIBA Agent 146 extracts the create request from the CMIP message and formats it into a structure suitable for use by the Action Logger 146 which, in turn, extracts the subscription version data from the structure. The Action Logger 146, which communicates directly with the RIBA Agent 146, is started by the Process Monitor 132 at the request of the RIBA Agent 146.

The Notification Logger 156 is used to log notifications received by the RIBA Agent 146. In this way, the NPAC-SMS Operational Information and Version New NPA-NXX notifications are logged. The RIBA Agent 146 receives these notifications from the NPAC/SMS 74, formats the information into a usable structure and forwards the structure to the Notification Logger 156 over a UNIX socket. The Notification Logger 156 is started by the Process Monitor 132 at the request of the RIBA Agent 146.

The Recovery Complete Logger 158 is used to log Recovery Complete Replies and Download Replies sent by the NPAC/SMS 74 to the RIBA Agent 146. The RIBA Agent 146 receives these actions from the NPAC/SMS 74, formats the information into a usable structure and forwards the structure to the Recovery Complete Logger 156 over a UNIX socket. The Recovery Complete Logger 156 is started by the Process Monitor 132 at the request of the RIBA Agent 146.

Table 2 is a domain field listing for an the IBA Database 144 according to one embodiment:

TABLE 2

Domain field list for IBA Database.

| Name | Code | Label | Type |
| --- | --- | --- | --- |
| billingIdentifier | BILLING_ID | Billing Identifier | VARCHAR2(4) |
| booleanIndicator | BOOL_IND | Boolean Indicator | NUMBER(1) |
| city | CITY | | VARCHAR2(20) |
| CLASS DPC | CLASS_DPC | | VARCHAR2(9) |
| CLASS SSN | CLASS_SSN | | NUMBER(3) |

TABLE 2-continued

Domain field list for IBA Database.

| Name | Code | Label | Type |
|---|---|---|---|
| CNAM DPC | CNAM_DPC | | VARCHAR2(9) |
| CNAM SSN | CNAM_SSN | | NUMBER(3) |
| contactType | CONTACT_TYPE | Contact Type | VARCHAR2(2) |
| country | COUNTRY | | VARCHAR2(20) |
| EndUserLocationType | END_USER_LOC_TYPE | | VARCHAR2(2) |
| EndUserLocationValue | END_USER_LOC_VALUE | | VARCHAR2(12) |
| identifier | ID | | NUMBER(10) |
| ISVM DPC | ISVM_DPC | | VARCHAR2(9) |
| ISVM SSN | ISVM_SSN | | NUMBER(3) |
| LIDB DPC | LIDB_DPC | | VARCHAR2(9) |
| LIDB SSN | LIDB_SSN | | NUMBER(3) |
| LNPtype | LNP_TYPE | | NUMBER(1) |
| LRN | LRN | | VARCHAR2(10) |
| NPA NXX | NPA_NXX | NPA-NXX | VARCHAR2(6) |
| operationAction | OPER_ACT | | NUMBER(3) |
| organizationId | ORGNZ_ID | ID number of an organiztion, client, NPAC, regional IBA. | VARCHAR(3) |
| Postal Code | PC | Postal Code | VARCHAR2(40) |
| servProvID | SP_ID | | VARCHAR2(4) |
| stateProvince | STATE_PROV | State/Province | VARCHAR2(2) |
| status | STATUS | Status Flag | NUMBER(10) |
| systemType | SYSTEM_TYPE | | N1 |
| telephoneNumber | TN | Telephone Number | VARCHAR2(10) |
| timestamp | T2 | | DATE |
| tunableName | TUNABLE_NAME | Tunable Name | VARCHAR2(40) |
| tunableValue | TUNABLE_VALUE | Tunable Value | VARCHAR2(40) |
| useIdentifier | USER_ID | | VARCHAR2(30) |
| zip | ZIP | | VARCHAR2(40) |

The RIBA Process Monitor 167, which was previously described in reference to the SOA Subsystem 72 (FIG. 5), watches over all of the standard applications or processes required to run the RIBA Subsystem 76. The RIBA Process Monitor 167 does not, however, monitor the FTP processes 162 and 164, or the RIBA Converter Process 170. The RIBA Process Monitor 167 starts applications when they are required and is notified if an application terminates. If an application, which is intended to always be running terminates, such as the RIBA Agent 146 and RIBA Check Link 168, the RIBA Process Monitor 167 will automatically restart the terminated application. The RIBA Check Link application 168 monitors the physical connection between the RIBA Subsystem 76 and NPAC/SMS 74. If the physical connection is broken, the RIBA Check Link 168 will reset the RIBA Subsystem 76.

The RIBA Converter Process 170 is a stand-alone process for NPA-NXX Split processing that performs a conversion of the telephone number value in the RIBA Subscription Version table. Using tunable database links, the RIBA Converter Process 170 accesses the NPA Split table in the IBAR Database 172 (FIG. 7) to determine the NPA-NXXs that are splitting, and their Permissive Dialing Periods ("PDPs"). At the start of a PDP, for a given NPA-NXX, the RIBA Converter Process 170 performs a telephone number conversion. Each telephone number record is retrieved from the RIBA Database 144 to determine if the telephone number contains the old NPA-NXX. If so, the telephone number is modified to the new NPA-N. Other processes within the RIBA Subsystem 76 are suspended for the duration of the conversion process.

Figure 7:
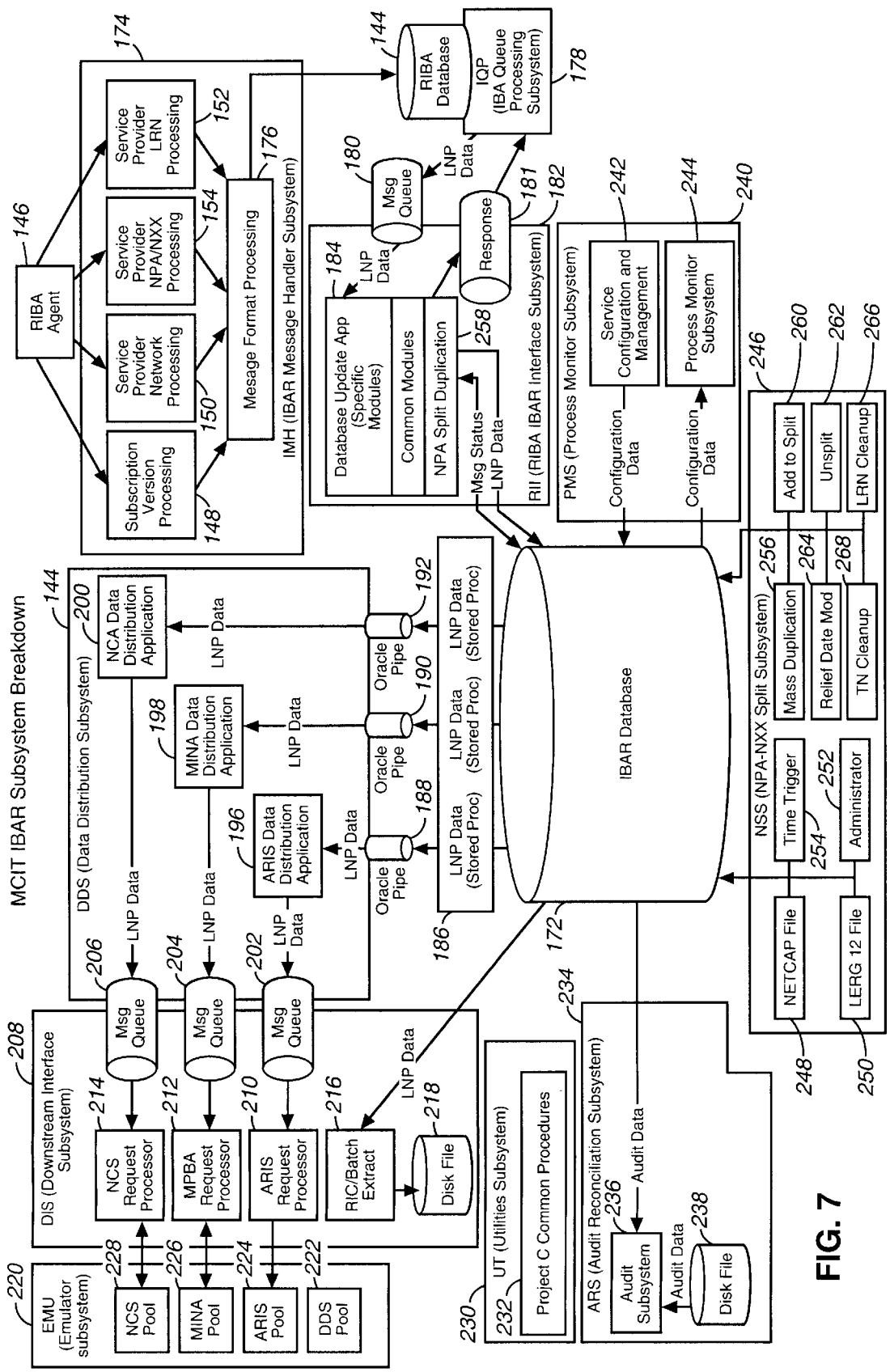
FIG. 7 is a block diagram of the IBAR broken down into its component subsystems according to one embodiment.

Turning to FIG. 7, the Interface Broadcast Agent Repository ("IBAR") Subsystem is shown and denoted generally as 86. A particularly advantageous aspect of the present invention is that it provides interfaces from the IBAR Subsystem 86 to internal systems operated by the individual service providers. FIG. 7 illustrates four (4) proprietary downstream systems have been coupled to the IBAR Subsystem 86 for receiving data. The NCS 100 and RTE7 102 systems manage local number portability information in the long distance environment while the MINA/SMS 98 is configured to manage local number portability information on the local service network level. Also, the ARIS 96 collects local number portability ("LNP") information for distribution to service provider business systems 68 (FIG. 2) and 88 (FIG. 3).

As such, and according to one embodiment of the invention, the IBAR Subsystem 86 supports the following features:

A facility to consolidate LNP data from the RIBA Database 144 into the IBAR Database 172.

A data distribution application that manages distribution of data to the ARIS 96, MINA/SMS 98, and NCS 100 systems. This application will track the status of transactions to each of these systems.

An on-line interface to the NCS long distance support system 100 preferably using the DECmessageQ product from Digital Equipment Corp.

An on-line interface to the MINA/SMS system 98 preferably using Service Builder System Management Interface product from Northern Telecom.

An on-line interface to the ARIS system 96 preferably using the Registry Messaging product from MCI.

A batch interface to the RTE7 long distance support system 102 using FTP.

NPA-NXX Split Processing.

The IBAR Message Handler Subsystem 174 comprises the message handlers in the RIBA Subsystem 76 (FIG. 6). As previously described, the RIBA Agent 146 receives messages containing data from the NPAC/SMS 74 (FIG. 6). These messages are then directed to the proper message handlers: Subscription Version Message Handler 148, Network Message Handler 150, LRN Message Handler 152, and NPA-NXX Message Handler 154. These message handlers process the messages and data in block 176 (not explicitly shown in FIG. 6) and stores the data in the RIBA Database 144. The IBAR Message Handler Subsystem 174 also inserts the data into a feeder table which will be read by the IBA Queue Processing Subsystem 178.

The IBA Queue Processing Subsystem 178, which is responsible for sending all changes received by the RIBA Database 144 to the RIBA/IBAR Interface Subsystem 182, reads the data from the feeder table and tags each message with a tracking number before it is put into the Message Queue 180. As will be described below, the tracking number ensures that the messages are delivered in sequential order.

The RIBA/IBAR Interface Subsystem 182 is responsible for keeping the IBAR Database 172 up to date with the changes that are made in the RIBA Database 144. The RIBA/IBAR Interface Subsystem 182 includes a database update application 184 that reads and processes the messages from the Message Queue 180. During processing, the underlying message data is acquired and organized by tasks, which are broken down at the "object" level (i.e. Telephone Number, Audit, Service Provider, and Network). The database update application 184 then updates the appropriate database fields in the IBAR Database 172 with the "object" data and calls stored procedures 186 to populate dedicated links 188, 190 and 192 with the information stored in the IBAR Database 172.

To ensure that duplicate messages are not processed, the RIBA/IBAR Interface Subsystem 182 verifies that each message read from the Message Queue 180 is the next consecutively numbered message. The RIBA/IBAR Interface Subsystem 182 also provides the ability to track messages from any RIBA Subsystem 76 by recording all tracking numbers associated with each RIBA Subsystem 76 and its associated record in the IBAR Database 172.

At the end of a successful transaction, the RIBA/IBAR Interface Subsystem 182 sends a response to the Response Queue 181 for each message received from Message Queue 180 as to whether it was successfully applied, rejected due to validation errors, or needs to be resent to the Message Queue 180. The IBA Queue Processing Subsystem 178 reads the responses from the Response Queue 181, processes them, and makes the appropriate updates to the table. For example, if the tracking number is out of sequence, the RIBA/IBAR Interface Subsystem 182 issues a "resend" of the specific message and any messages that have been put into the Message Queue 180 after the specific message. If, however, the specific message cannot be found in the table, the IBA Queue Processing Subsystem 178 sends a "lost" message notification and the resend process continues.

Multiple instances of the RIBA/IBAR Interface Subsystem 182 can be run to accommodate various types of NPAC/SMS 74. This allows each NPAC/SMS 74 to have different information that is to be sent to the RIBA Subsystem 76 and then to the IBAR Subsystem 86. As a result, a version ID is used to identify the type of NPAC/SMS 74 reviewing a given region so that all information can be sent to one Message Queue 180.

As mentioned above, stored procedures 186 extract data from the IBAR Database 172 and write the data to the appropriate dedicated links 188, 190 and 192. Each downstream on-line Data Distribution Application has its own dedicated link (e.g., link 188 for ARIS 96 messages, link 190 for MINA/SMS 98 messages and link 192 for NCS 100 messages). Data from each dedicated link is then read by the appropriate dedicated Data Distribution Application (e.g., application 196 for ARIS 96 messages, application 198 for MINA/SMS 98 messages, and application 200 for NCS 100 messages).

These dedicated Data Distribution Applications, which are part of the Data Distribution Subsystem 194, then send the transactions to a second set of Message Queues, each dedicated Data Distribution Application having its own dedicated Message Queue (e.g., Message Queue 202 for ARIS 96 messages, Message Queue 204 for MINA/SMS 98 messages, and Message Queue 206 for NCS 100 messages). The Message Queues 202, 204 and 208 then send the transactions to the Downstream Interface Subsystem 208, which contains an interface for each application format (e.g., ARIS Request Processing Interface 210 for ARIS 96 messages, MINA/SMS Request Processing Interface 212 for MINA/SMS 98 messages, and NCS Request Processing Interface 214 for NCS 100 messages).

Once the message has been sent to the appropriate interface in the Downstream Interface Subsystem 208, the status of the record in the IBAR Database 172 will be changed to "Sending." In addition, the Message Queues 202, 204 and 206 are continuously monitored as transactions are added to them so that any errors can be found and an alarmed can be triggered. In the event of a message failure, or a process or system failure, or during system startup, a recovery process is started and the status of the records in the IBAR Database 172 are checked. During this recovery process, all records in the IBAR Database 172 having a status of "Sending" will be resent to the Downstream Interface Subsystem 208 in the same manner as previously described. Regular processing of messages from the IBAR Database 172 to the Downstream Interface Subsystem 208 will be held up until the recovery process is complete.

In the Downstream Interface Subsystem 208, a custom request processing application for each on-line interface to a network provider's external system will read the requests from a message and facilitate the transfer over the specific interface. They will format the data as required by the interface (e.g., Northern Telecom's Service Management Interface protocol requirements) and ensure that the data is delivered across the interface. Typically, the data is sent in a synchronous manner to the network provider's external system via an ASCII based TCP/IP socket interface. The network provider's external system is responsible for queuing the data to a serial communication port. The responses received from the network provider's external system can be sent in an asynchronous manner. Although the Downstream Interface Subsystem 208 as illustrated in FIG. 7 supports four proprietary interfaces, it should be understood that any interface can be supported depending on the external system used by the service provider.

The Downstream Interface Subsystem 208 uses various mechanisms that allow the IBAR Subsystem 86 to communicate with external systems. For example, the MINA/SMS Request Processing Interface 212 is implemented as a stream of data sent via a TCP/IP socket interface using SMI protocol. The NCS Request Processing Interface 214 is implemented using the ported telephone number and request Service Provider NPA-NXX data and is set up as a two-way dialog, i.e. data is sent to the NCS 100 and the NCS 100 replies after processing the data. The ARIS Request Processing Interface 210 is implemented using the ported telephone number data and uses MCI Registry or a similar communications protocol, which is a one-way dialog, i.e. data is sent to ARIS 96, but ARIS 96 does not return confirmation after processing the data. Unlike the other Request Processing Interfaces 210, 212 and 214, the RTE7 Batch Extract 216 consists of a regularly scheduled batch job that extracts the required transactions directly from the IBAR Database 172 and writes them to a disk file 218. The resulting disk file 218 is transmitted to RTE7 102 via TCP/IP using FTP.

Using the above described Request Processing Interfaces 210, 212 and 214, a user is able to access a menu from which the user can: connect or disconnect from the NCS Message Queue; logon or logoff the MINA/SMS session; or register or deregister from the ARIS registry. In response to the user's selection, the Service Configuration and Management Application 242 sends a signal to one of three Request Processing Interfaces 210, 212 or 214. For example, in the UNIX operating environment, two signals are used: SIGUSR1 and SIGUSR2. The SIGUSR1 signal is used for "connect", "logon" and "register" commands; whereas the SIGUSR2 signal is used for "disconnect", "logoff" and "deregister" commands.

An Emulator Subsystem 220 is communicably linked to the Downstream Interface Subsystem 208 and is used for testing and validating the Downstream Interface Subsystem 208. Communication between the Downstream Interface Subsystem 208 and Emulator Subsystem 220 is accomplished using different protocols for each individual program, such as: a DEC Message Queue for the DDS Emulator 222 and the NCS Emulator 228; a UNIX TCP/IP socket library for the MINA/SMS Emulator 226; and Registry for the ARIS Emulator 224.

The Utilities Subsystem 230 contains a set of utility functions and common procedures 232 that are used to speed up the development of UNIX and SQL programs. These functions have been developed specifically for use in the IBAR Subsystem 86 application environment and provide solutions to common problem requirements such as Oracle stored procedures 184, Message Queue access, FTP access, error handling, process signal control and any other software functions that may be best implemented as a utility.

An Audit Reconciliation Subsystem 234 provides service providers interfacing with the IBAR Subsystem 86 the ability to audit their databases against the IBAR Database 172. Some service providers may consider the IBAR Database 172 to be the database of record for LNP data. The Audit Reconciliation Subsystem 234 supports both regularly scheduled and on demand audit requests. The Audit Reconciliation Subsystem 234 will support requests for subsets of the data in the IBAR database 162 as well as complete database dumps. A system administrator can schedule these requests and will manually clean out any audit files that are no longer required. Specifically, the Audit Subsystem 236 extracts the audit data from the IBAR Database 172 and writes it to a disk file 238 that can be distributed using FTP.

The Process Monitor Subsystem 240 provides the means to start and stop the IBAR applications and includes the Service Configuration and Management Application 242, which was previously described, and a Process Manager 244. The Service Configuration and Management Application 242 provides the means to stop and restart communications between each of the real time on-line interfaces found in the Distribution Interface Subsystem 208 and its downstream server counterpart operated by the service provider. The Process Manager 244 provides the means to stop and restart the RIBA/IBAR Interface Subsystem 182, the Data Distribution Subsystem 194 and the Downstream Interface Subsystem 208. Accordingly, the Process Monitor Subsystem 244 is started at system start-up and spawns the initial IBAR applications. The Process Monitor 244 also monitors each application process and will re-start any process that terminates abnormally. In other embodiments, the Process Monitor 244 can spawn more copies of the same systems upon request. The initial information is stored in a file and loaded by the Process Monitor 244 when it is started.

The NPA-NXX Split Subsystem 246 is responsible for processing NPA splits and includes several processes: NETCAP File Access Process 248; LERG 12 File Access Process 250; Administrator Process 252; Time Trigger Process 254; Mass Duplication Process 256; Add-to-Split Process 260; Unsplit Process 262; Relief Date Modification Process 264; LRN Cleanup Process 266; and Telephone Number Cleanup Process 268. These processes are described below.

The NETCAP File Access Process 248 determines when an NPA is going to split, what the new NPA-NXX is going to be, and at what date the split will occur. The NETCAP File Access Process 248 reads the NETCAP file and updates the NPA Split table in the IBAR Database 172 as appropriate. The NPA Split table in the IBAR Database 172 is where the status of each split is tracked and is used to provide the key input for driving NPA Split processing. The NETCAP file is the primary external data source of NPA Split information and is in a mainframe dataset format that must first be retrieved via FTP or some other mainframe-to-Unix utility. Although the NETCAP File Access Process 248 is preferably a regularly scheduled daily batch job, it can also be started manually by the system operator.

More specifically, the NETCAP File Access Process 248 first determines whether the NPA-NXX in the NETCAP file is portable by looking for the NPA-NXX in the IBAR Database 172. If the NPA-NXX does not exist in the IBAR Database 172, the NPA-NXX is bypassed. If on the other hand, the NPA-NXX does exist, the NPA-NXX is deemed to be portable and the RIBA Subsystem 76 associated the NPA-NXX is determined using the Action ID in the IBAR Database 172.

The NETCAP File Access Process 248 then determines the type of record to insert, modify or delete in the NPA Split table for the portable NPA-NXX. Existing NPA Split records having a status of "Completed" are deleted. A NPA Split record having an action of "Unsplit" may also be deleted prior to the Duplication Trigger Point. If the Relief Date for a NPA split record changes before the Mass Duplication Process 256 has been run, then only the NPA Split record's Relief Date is modified and the Relief Date Modification Process is not required.

The LERG12 File Access Process 250 reads the LERG 12 file and updates the LERG 12 table in the IBAR Database 172 as appropriate. The LERG 12 file is a mainframe dataset that is downloaded as a flat file for processing and is used as a secondary external data source of NPA Split information as it pertains to LRNs. The NPA-NXXs defined in the NETCAP data serve to identify both telephone numbers and LRNs affected by a split, as it is understood that LRNs contain valid NPA-NXXs. The LERG 12 data is used for confirmation that the LRNs identified as split-affected by the NETCAP data are valid split-affected LRNs according to the LERG. The LERG 12 File Access Process 250 is preferably a regularly scheduled monthly batch job.

The LERG12 File Access Process 250 checks for the existence of a LERG 12 flat-file. If one exists, the LERG 12 table, which is used for exception reporting, is purged so that the LERG 12 flat-file data can be re-inserted in the IBAR Database 172. This effectively replaces the old data in the LERG 12 table with the new data from the LERG 12 flat-file. The LERG 12 File Access Process 250 also has the ability to designate the LERG 12 flat-file via a command-line specified filename (optional), instead of using the default provided within the program.

The Administrator Process 252 produces exception reports based on information retrieved from the IBAR Database 172, the NETCAP file and the LERG 12 file. This process is executed on demand by a systems administrator or operator.

The Time Trigger Process 254 reads the NPA Split table in the IBAR Database 172 and processes each active record according to the Action and Status attributes and other tunable parameters, such as the Duplication Trigger Point. The Duplication Trigger Point is a tunable period of time prior to the start of Permissive Dialing Period. The Time Trigger Process 254 updates the NPA Split table as appropriate and starts the following processes: the Mass Duplication Process 256, the Add-to-Split Process 260, the Unsplit Process 262, the Relief Date Modification Process 264, the LRN Cleanup Process 266, and the Telephone Number Cleanup Process 268.

The Time Trigger Process 254 is also responsible for setting a suspend flag in the IBAR Database 172 that, as will be described below, suspends the RIBA/IBAR transaction flow prior to the running of the Mass Duplication Process 256, the Add-to-Split Process 260 and the Unsplit Process 262. This ensures that all existing IBAR transactions will be processed without interruption of the incoming flow and that none of the new incoming transactions will be inadvertently bypassed during split processing. Once the Mass Duplication Process 256, Add-to-Split Process 260 and Unsplit Process 262 are complete, the Time Trigger Process 254 resets the suspend flag.

The Time Trigger Process 254 runs continuously under the control of the Process Monitor 244. At a tunable period of time and after each pass through the NPA Split table, the Time Trigger Process 254 sleeps for a short time. There will be one instance of the Time Trigger Process 254 for each RIBA Subsystem 76 to facilitate processing of the NPA Split table. Each RIBA Subsystem 76 will process only the NPA-NXXs particular to the region serviced by the RIBA Subsystem 76 and the Regional NPAC/SMS 74. Each NPA Split record is processed in a synchronous mode such that, for each NPA Split record read, a process may or may not be executed depending on its conditions, and the process will be completed before the next NPA Split record is retrieved.

The Mass Duplication Process 256 reads the IBAR Database 172 and determines which records need to be duplicated for NPA Splits. Each current record that contains the affected NPA-NXX and an action of "Activate" or "Modify" is duplicated. The duplicated records are written to the IBAR Database 172 and then sent to MINA/SMS 98 by batch file and to the NCS 100 via Oracle pipes. The duplicated records are not sent to ARIS 96. The Mass Duplication Process 256 is started by the Time Trigger Process 254 when the Duplication Trigger Point is reached for a given NPA-NXX.

The NPA Split Duplication Process 258 within the RIBA/IBAR Interface Subsystem 182 is responsible for notifying the IBA Queue Processing Subsystem 178 to suspend the RIBA to IBAR transaction flow and for duplicating incoming transactions at the appropriate time. For NPA Split processing, the NPA Split Duplication Process 258 regularly examines the suspend flag in the IBAR Database 172 that is set by the Time Trigger Process 254. When the suspend flag is set, the NPA Split Duplication Process 258 notifies the IBA Queue Processing Subsystem 178 via the Response Queue 181, which then stops sending messages from the RIBA Database 144 to the Message Queue 180. The IBA Queue Processing Subsystem 178 periodically sends a message to the RIBA/IBAR Interface Subsystem 182 prompting the NPA Split Duplication Process 258 to check on the status of the suspend flag. Once the suspend flag has been reset by the Time Trigger Process 254, the NPA Split Duplication Process 258 notifies the IBA Queue Processing Subsystem 178 via the Response Queue 181 to resume sending messages.

For duplicating incoming transactions, the NPA Split Duplication Process 258 first completes regular processing of each transaction, including committing the record the IBAR Database 172. The NPA Split Duplication Pr transaction against the NPA Split table in the IBAR Database 172 to determine whether the transaction is to be duplicated or not. A transaction is duplicated if the telephone number contains an affected NPA-NXX, the action is "Activate," "Modify" or "Disconnect" and the current processing time is between the Duplication Trigger Point and the Mandatory Dialing Date. Duplicated transactions are assigned an Action ID indicating that it is a duplicate and not an original transaction.

Transactions that are duplicated during the period from the Duplication Trigger Point to the Relief Date are sent only to MINA/SMS 98 and NCS 100 via existing mechanisms. Transactions that are duplicated during the period from the Relief Date to the Mandatory Dialing Date are sent to ARIS 96, MINA/SMS 98 and NCS 100 via existing mechanisms.

The Add-to-Split Process 260 performs the same role as the Mass Duplication Process 256 in reading the IBAR Database 172 and determining which records need to be duplicated for NPA Splits. This process, however, can be triggered by the Time Trigger Process 254 at any time that the Time Trigger Process 254 retrieves an NPA Split record indicating that an NPA-NXX requires Add-to-Split processing. An Add-to-Split can occur before and during the Permissive Dialing Period, with the same, or with different, start and end Permissive Dialing Period dates.

The records duplicated by the Add-to-Split Process 260 are written to the IBAR Database 172 and then sent to MINA/SMS 98 via the regular mechanism and not by batch file, as in the case of the Mass Duplication Process 256. These duplicated records are also sent to NCS 100, but are not sent to ARIS 96.

The Unsplit Process 262 reads the IBAR Database 172 and determines which telephone numbers require a "Duplicated Disconnect" transaction, due to a NPA-NXX Unsplit. A "Duplicate Disconnect" transaction is created for each telephone number that contains an NPA-NXX that has been unsplit, and any action other than "Disconnect" or "Duplicate-Disconnect." The "Duplicate Disconnect" transactions are sent to NCS 100 via the regular method, but are not sent to the ARIS 96 or the MINA/SMS 98. ARIS 96 performs Unsplit processing of its own and MINA/SMS 98 is informed of "Disconnect" telephone numbers via E-mail.

The Unsplit Process 262 can be triggered by the Time Trigger Process 254 at any time between the Duplication Trigger Point and the Mandatory Dialing Date, if the Mass Duplication Process 256 has been run. The Time Trigger Process 254 ensures that the RIBA/IBAR incoming transaction feed is suspended prior to the running of the Unsplit Process 262.

The Relief Date Modification Process 264 reads the IBAR Database 172 and determines which records need to be updated with a new Relief Date. Each record that contains an affected NPA-NXX is updated with the new Relief Date. These modifications are not sent to ARIS 96, MINA/SMS 98 or NCS 100. The Relief Date Modification Process 264 is triggered by the Time Trigger Process 254 at any time prior to Permissive Dialing Period if the Mass Duplication Process 256 has been run.

The LRN Cleanup Process 266 reads the IBAR Database 172 and determines which records require a modification to the LRN attribute. A "Modify" transaction is created for each record that contains an LRN with an old NPA-NXX, a telephone number not containing an old NPA-NXX, and any action other than "Disconnect" or "Duplicate Disconnect." The "Modify" transactions are sent to ARIS 96, MINA/SMS 98 and NCS 100 using the regular methods. The LRN Cleanup Process 266 is triggered by the Time Trigger Process 254 to run at the LRN Clean-up Trigger Point, which is a tunable number of hours prior to the Mandatory Dialing Date.

The Telephone Number Cleanup Process 268 reads the IBAR Database 172 and determines which records require a "Disconnect" transaction. A "Disconnect" transaction is created for each record that contains an old NPA-NXX and any action other than "Disconnect" or "Duplicate-Disconnect." The "Disconnect" transactions are sent to NCS 100 using the regular methods, but are not sent to ARIS 96 or MINA/SMS 98. The MINA/SMS 98 is informed of "Disconnect" telephone numbers via E-mail. The Telephone Number Cleanup Process 268 is triggered by the Time Trigger Process 254 at the telephone number Clean-up Trigger Point which is a tunable number of hours after the Mandatory Dialing Date.

Briefly referring back to FIGS. 3 and 4, the SOA Engine Subsystem 80 uses a message-based protocol to provide an interface between the Local Customer Order Entry/Order Processing ("OE/OP") Systems (collectively referred to as the "Front End") 78 and the SOA 32 and RIBA 34 Subsystems. Thus, the SOA Engine Subsystem 80 allows the Front End 78 to upload data, audit, query and otherwise communicate with the NPAC/SMS 74.

Figure 8:
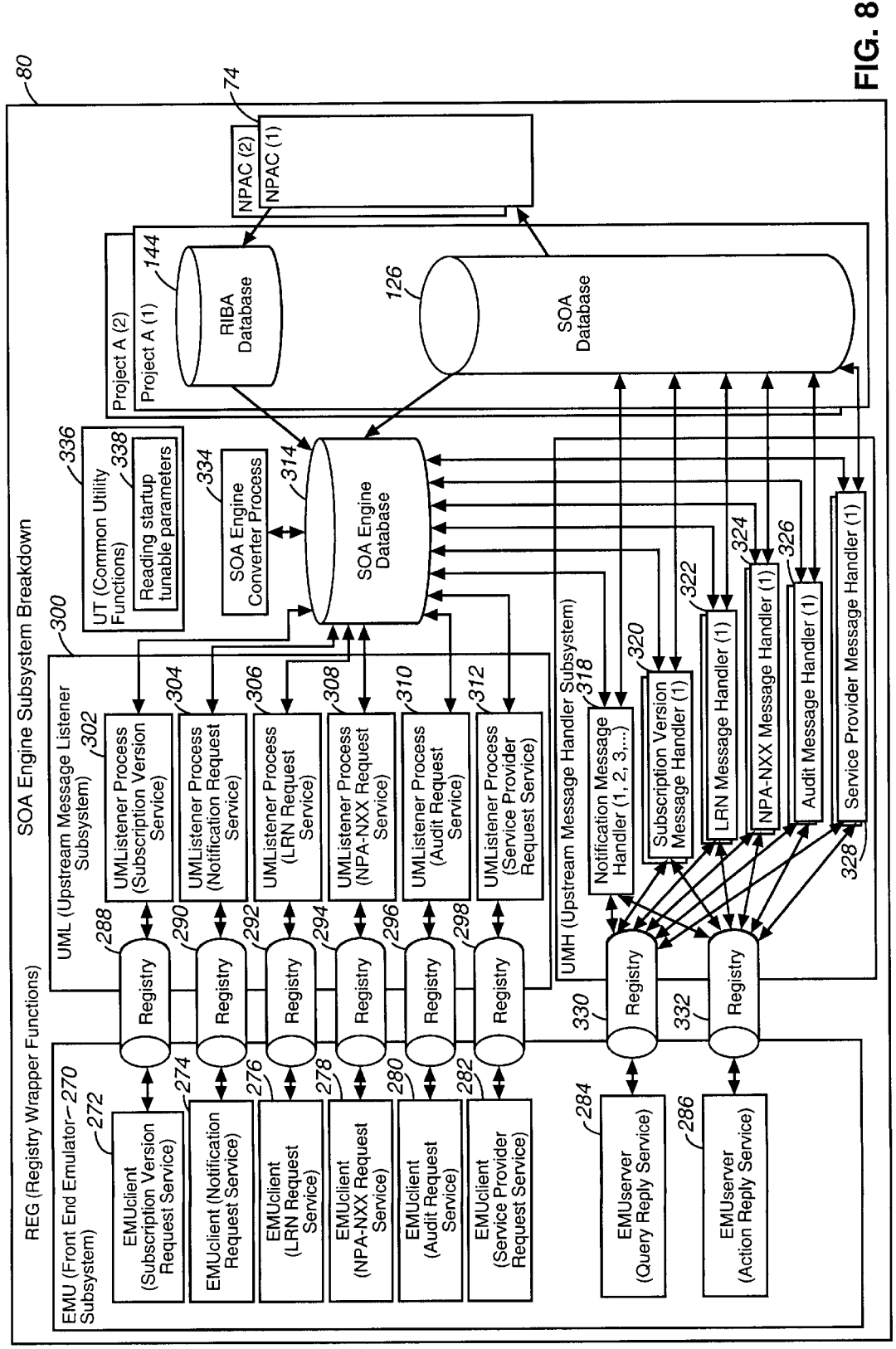
FIG. 8 is a block diagram of the SOA Engine broken down into its component subsystems according to one embodiment.

Now referring to FIG. 8, the SOA Engine Subsystem 80 will be described in detail. The Front End Emulator Subsystem 270 includes both client and server applications, which provide the interface between the SOA Engine Subsystem 80 and the Front End 78. The client applications handle requests from the Front End 78, whereas the server applications handle reply or responses to the Front End 78. More specifically and as illustrated in FIG. 8, the client applications may include a Subscription Version Request Service 272, a Notification Request Service 274, a LRN Request Service 276, a NPA-NXX Request Service 278, an Audit Request Service 280 and a Service Provider Request Service 282. The server applications may include a Query Reply Service 284 and an Action Reply Service 286.

Each client application 272, 274, 276, 278, 280 and 282 sends request messages from the Front End 78 to an Upstream Message Listener Subsystem 300 using the appropriate Registry protocols 288, 290, 292, 294, 296 and 298. Once a client application 272, 274, 276, 278, 280 or 282 sends a request message, that client application will wait for a reply message before sending another request message.

For each request message, the Upstream Message Listener Subsystem 300 determines the particular NPAC/SMS 74 to which the request message is to be delivered to and writes the request message to the SOA Engine Database 314 using a Subscription Version Request Listener 302, a Notification Request Listener 304, a LRN Request Listener 306, a NPA-NXX Request Listener 308, an Audit Request Listener 310 and a Service Provider Request Listener 312. The appropriate Listener 302, 304, 306, 308, 310 or 312 also sends a reply message back to Front End 78 through the appropriate client application 272, 274, 276, 278, 280 or 282. The reply message indicates only that the request message has been received and queued for transmission to the appropriate NPAC/SMS 74, and does not indicate that the request message has been sent to or processed by the NPAC/SMS 74.

The SOA Engine Database 314 contains a queuing table for each type of request message. The Upstream Message Handler Subsystem 316 polls these queuing tables using a Notification Message Handler 318, a Subscription Version Message Handler 320, a LRN Message Handler 322, a NPA-NXX Message Handler 324, an Audit Message Handler 326 and a Service Provider Message Handler 328 to retrieve the appropriate records and processes them accordingly. These Message Handlers will now be described in more detail.

The Notification Message Handler 318 polls the Notification table in the SOA Engine Database 314 to retrieve all records and determines the action to be performed on each retrieved record based on the record message type and status. If the record is a new request, the information needed to create the response message will be fetched from the SOA Database 126 or the corresponding database table will be updated. As was previously described in regard to FIG. 5, the new request message is processed by the SOA Subsystem 72, sent to and processed by the NPAC/SMS 74 and a response message is created and returned containing the result of the new request message. If the record is not a new request, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Notification table in the SOA Engine Database 314. Otherwise, the result status of Notification table will be updated for the request. The Notification Message Handler 318 keeps running until all the records in the Notification table are processed. If there are no more records in the Notification table, the Notification Message Handler 318 sleeps for a certain time before it wakes up and begins to poll the Notification table again.

The Subscription Version Message Handler 320 polls the Subscription Version queuing table in the SOA Engine Database 314 to retrieve all records based on a telephone number range. The Subscription Version Message Handler 320 analyzes each retrieved record and determines the action to be performed based on the record message type and status. If the record is a new message the Subscription Version Message Handler 320 calls the appropriate stored procedure 120 (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the Subscription Version queuing table and a response message is created containing the message data and header. If the record is not a new message, a "resend" message will be reissued containing only the error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Notification Message Handler 318. If the confirmation message is received, the Notification Message Handler 318 deletes the record from the Subscription Version queuing table in the SOA Engine Database 314.

The LRN Message Handler 322 polls the LRN queuing table in the SOA Engine Database 314 to retrieve all LRN Message records. The LRN Message Handler 322 analyzes each retrieved record and determines the action to be performed based on the record message type, status and received date. If the record is a new message, the LRN Message Handler 322 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and a response message will be created. If the record is not a new message, the date of the record is examined. If it is expired, it will be deleted from LRN queuing table. Otherwise, an error response message will be created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the LRN Message Handler 322. If the LRN Message Handler 322 receives the confirmation message, the LRN Message Handler 322 deletes the record from the LRN Message queuing table in the SOA Engine Database 314. Otherwise, the result status of the LRN Message queuing table will be updated for the request.

The NPA-NXX Message Handler 324 polls the NPA-NXX queuing table in the SOA Engine Database 314 to retrieve all NPA-NXX Message records. The NPA-NXX Message Handler 324 analyzes each record retrieved and determines the action to be performed based on the message type, status, and received date. If the record is a new message, the NPA-NXX Message Handler 324 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and a response message created. If the record is not a new message, the date of the record is examined and if it is expired, it will be deleted from NPA-NXX queuing table. Otherwise, an error response message is created.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the NPA-NXX Message Handler 324. If the NPA-NXX Message Handler 324 receives the confirmation message, the NPA-NXX Message Handler 324 deletes the record from the NPA-NXX queuing table in the SOA Engine Database 314. Otherwise, the result status of the NPA-NXX queuing table will be updated for the request.

The Audit Message Handler 326 polls the Audit queuing table in the SOA Engine Database 314 to retrieve all request records for processing. The Audit Message Handler 326 analyzes each record retrieved and determines the action to be performed based on the message type and status. If the record is a new message, the Audit Message Handler 326 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Audit Message Handler 326. The Audit Message Handler 326 waits until the confirmation message is received in order to delete the record from the message queuing table in the SOA Engine Database 314.

The Service Provider Message Handler 328 polls the Service Provider queuing table in the SOA Engine Database 314 to retrieve all request records. The Service Provider Message Handler 328 analyzes each record retrieved and determines the action to be performed based on the message type and status. If the record is a new message, the Service Provider Message Handler 328 calls the appropriate stored procedure (FIG. 5) in the SOA Database 126. As was previously described in regard to FIG. 5, the new request message is processed by the SOA Subsystem 72, sent to and processed by the NPAC/SMS 74 and a response message is created and returned containing the result of the new request message. Once a response is received from the stored procedure 120 (FIG. 5), it is evaluated and the return code is used to update the record status in the queuing table and a response message is created containing the header and the message data. If the record is not a new message, the response message is created containing an error message header. If the record is a new message, but has been queued longer than a configurable amount of time, it will be considered to have expired and the response message is created containing an error message header.

The appropriate response message is then sent to the Front End 78 via Registry 330 and Query Reply Service 284, or Registry 332 and Action Reply Service 286 where it is parsed, displayed on the console, and saved to a Log file. If the Front End 78 successfully receives the response message, a confirmation message is sent back to the Service Provider Message Handler 328. The Service Provider Message Handler 328 waits until the confirmation message is received in order to delete the record from the message queuing table in the SOA Engine Database 314.

The SOA Engine Converter Process 334 is a stand-alone process that is started up as is needed. It accesses the NPA Split table in the IBAR Database 172, using tunable Oracle database links to determine the NPA-NXXs that are splitting and their Permissive Dialing Periods. At the start of a Permissive Dialing Period for a given NPA-NXX, the SOA Engine Converter Process 334 performs a telephone number conversion. Each telephone number record is retrieved from the SOA Engine Database 314 to determine if the telephone number contains the old NPA-NXX. If so, the telephone number is modified to the new NPA-NXX. Other processes within the SOA Engine Subsystem 80 continue processing during the conversion.

A Common Utility Function Subsystem 336 provides a set of utility functions that are available to speed development of UNIX and SQL programs. These utility functions, which include reading startup tunable parameters 338, are developed specifically for use in the SOA Engine Subsystem 80 application environment to provide solutions to common programming requirements, such as Oracle stored procedures.

Figure 9:
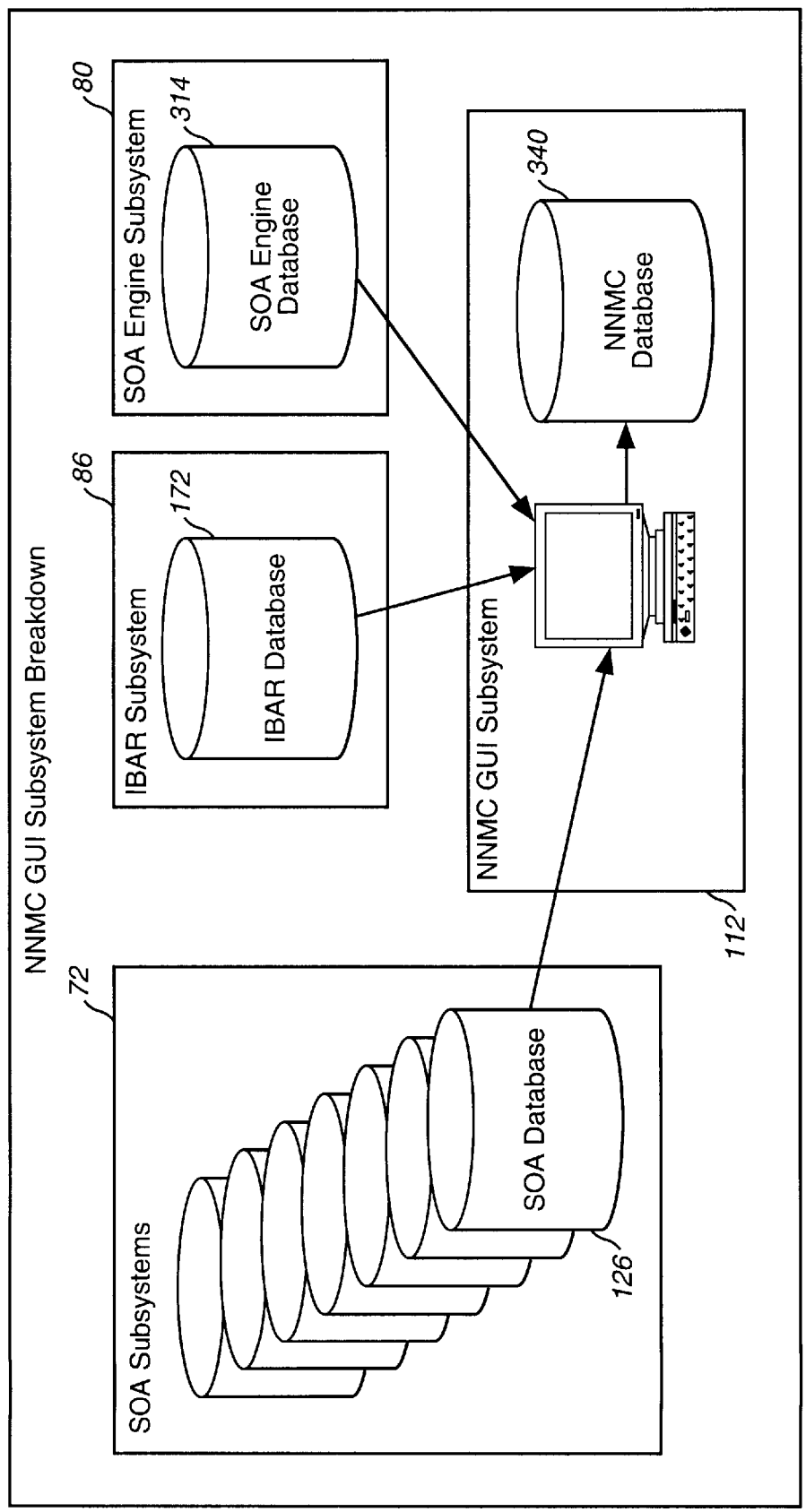
FIG. 9 is a block diagram of the NNMC GUI Subsystem according to one embodiment.

Now referring to FIG. 9, the NNMC GUI Subsystem 112 will be described. The GUI Subsystem 112 connects to the SOA Databases 126 in the SOA Subsystems 72, the IBAR Database 172 in the IBAR Subsystem 86, the SOA Engine Database 314 in the SOA Engine Subsystem 80. Access to the SOA 126, IBAR 172 and SOA Engine 314 Databases is performed via database links, which are stored in the NNMC Database 340. A table within the NNMC Database 340 tracks the number of queries performed per day, per SOA Subsystem 72 and IBAR Subsystem 86. The number of queries is limited to a tunable daily maximum before the end-user is denied access. Based on the telephone number queried, the NNMC GUI 112 uses a telephone number to NPAC cross-reference table within the SOA Engine Database 314 to determine the correct SOA Database 126 to access.

Figure 10:
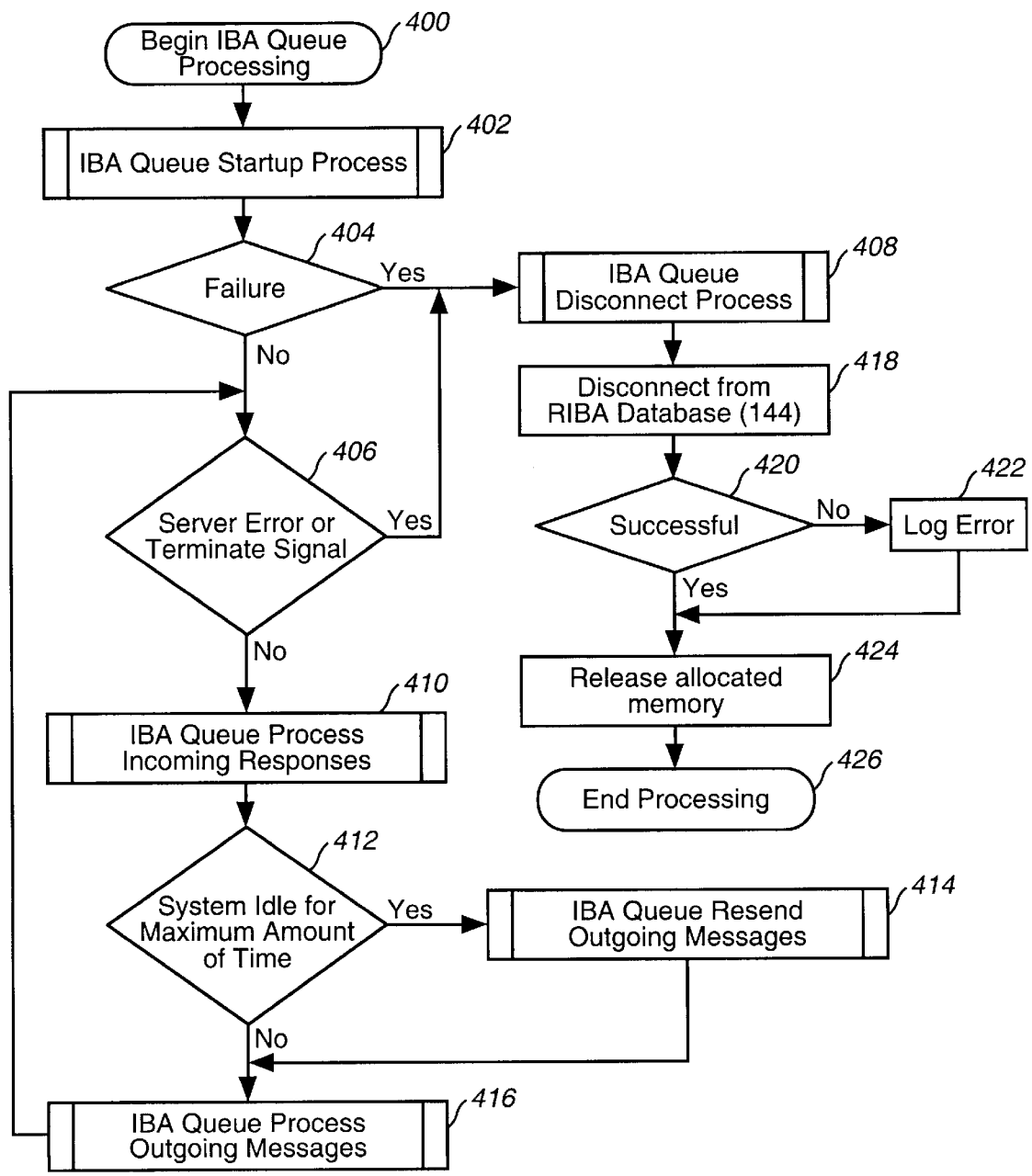
FIG. 10 is a flow chart for an IBA Queue Processing Subsystem according to one embodiment.

Turning now FIG. 10, the processing flow of the IBA Queue Processing Subsystem 178 (FIG. 7) will be described. Processing begins in block 400 and the IBA Queue Startup Process is called in block 402. The IBA Queue Startup Process 402 will be described below in reference to FIG. 10A. If the IBA Queue Startup Process 402 did not fail, as determined in decision block 404, decision block 406 determines whether a server error has occurred or a terminate signal has been received from the Process Monitor 240 (FIG. 7). If, however, the IBA Queue Startup Process 402 failed as determined in decision block 404, or a server error has occurred or a terminate signal has been received from the Process Monitor 240 (FIG. 7), as determined in decision block 406, the IBA Queue Disconnect Process is called in block 408. The IBA Queue Disconnect Process 408 will be described below in reference to FIG. 10I.

If, however, a server error has not occurred and a terminate signal has not been received from the Process Monitor 240 (FIG. 7), as determined in decision block 406, the IBA Queue Process Incoming Responses is called in block 410. The IBA Queue Process Incoming Responses 410 will be described below in reference to FIG. 10B. Thereafter, decision block 412 determines whether the system has been idle for a maximum amount of time. If the system has been idle for a maximum amount of time, the IBA Queue Resend Outgoing Messages is called in block 414. The IBA Queue Resend Outgoing Messages 414 will be described below in reference to FIG. 10C. If, however, the system has not been idle for a maximum amount of time, as determined in decision block 412, or the IBA Queue Resend Outgoing Messages in block 414 is complete, the IBA Queue Process Outgoing Messages is called in block 416. The IBA Queue Process Outgoing Messages 416 will be described below in reference to FIG. 10D. Thereafter, processing loops back to decision block 406.

After the IBA Queue Disconnect Process is complete in block 408, the IBA Queue Processing Subsystem 178 (FIG. 7) disconnects from the RIBA Database 144 (FIG. 7) in block 418. If the disconnect was not successful, the error is logged in block 422. If, however, the disconnect was successful, as determined in decision block 420, or the error has been logged in block 422, the allocated memory is released in block 424 and processing ends in block 426.

Figure 10A:
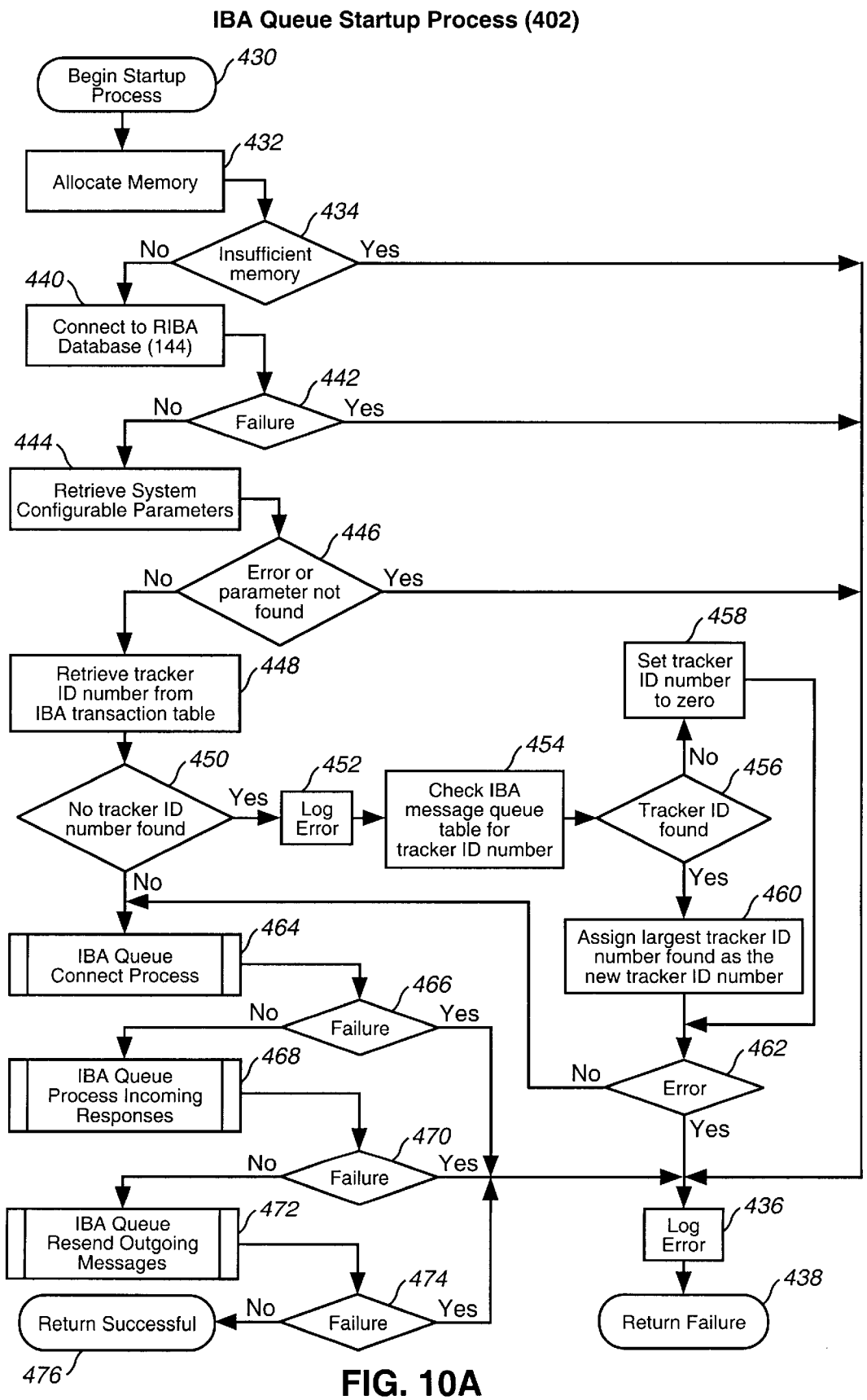
FIGS. 10A, 10B, 10C, 10D, 10E, 10F, 10G, 10H, 10I and 10J are flow charts for various processes in the IBA Queue Processing Subsystem according to one embodiment.

Turning now FIG. 10A, the processing flow of the IBA Queue Startup Process 402 will be described. Processing begins in block 430 and memory is allocated for the local buffers in block 432. If there is insufficient memory, as determined in decision block 434, the error is logged in block 436 and a failure notification is returned in block 438. If, however, there is sufficient memory, as determined in decision block 434, a connection is made to RIBA Database 144 (FIG. 7) in block 440. If the database connection failed, as determined in decision block 442, the error is logged in block 436 and a failure notification is returned in block 438. If, however, the database connection did not fail, as determined in decision block 442, the configurable system parameters are retrieved in block 444. If an error occurred or a parameter was not found, as determined in decision block 446, the error is logged in block 436 and a failure notification is returned in block 438.

If, however, an error did not occur and all parameters were found, as determined in decision block 446, the tracker ID number is retrieved from the IBA transaction table in block 448. If no tracker ID number is found, as determined in decision block 450, the error is logged in block 452 and the IBA message queue table is checked for a tracker ID number in block 454. If a tracker ID number is not found, as determined in decision block 456, the tracker ID number is assigned a value of zero in block 458. If, however, a tracker ID number is found, as determined in decision block 456, the largest tracker ID number found is assigned as the new tracker ID number in block 460. If an error occurs in assigning a value to the tracker ID number in either blocks 458 or 460, as determined in decision block 462, the error is logged in block 436 and a failure notification is returned in block 438. If an error did not occur in assigning a value to the tracker ID number in either blocks 458 or 460, as determined in decision block 462, or a tracker ID number was found, as determined in decision block 450, the IBA Queue Connect Process is called in block 464. The IBA Queue Connect Process 464 will be described below in reference to FIG. 10H.

If the IBA Queue Connect Process 464 failed, as determined in decision block 466, the error is logged in block 436 and a failure notification is returned in block 438. If, however, the IBA Queue Connect Process 464 did not fail, the IBA Queue Process Incoming Responses is called in block 468. The IBA Queue Process Incoming Responses 468 will be described below in reference to FIG. 10B. If the IBA Queue Process Incoming Response 468 failed, as determined in decision block 470, the error is logged in block 436 and a failure notification is returned in block 438. If, however, the IBA Queue Process Incoming Responses 468 did not fail, as determined in decision block 470, the IBA Queue Resend Outgoing Messages is called in block 472. The IBA Queue Resend Outgoing Messages 472 will be described below in reference to FIG. 10C. If the IBA Queue Resend Outgoing Messages 472 failed, as determined in decision block 474, the error is logged in block 436 and a failure notification is returned in block 438. If, however, the IBA Queue Resend Outgoing Messages 472 did not fail, a successful notification is returned in block 476.

Figure 10B:
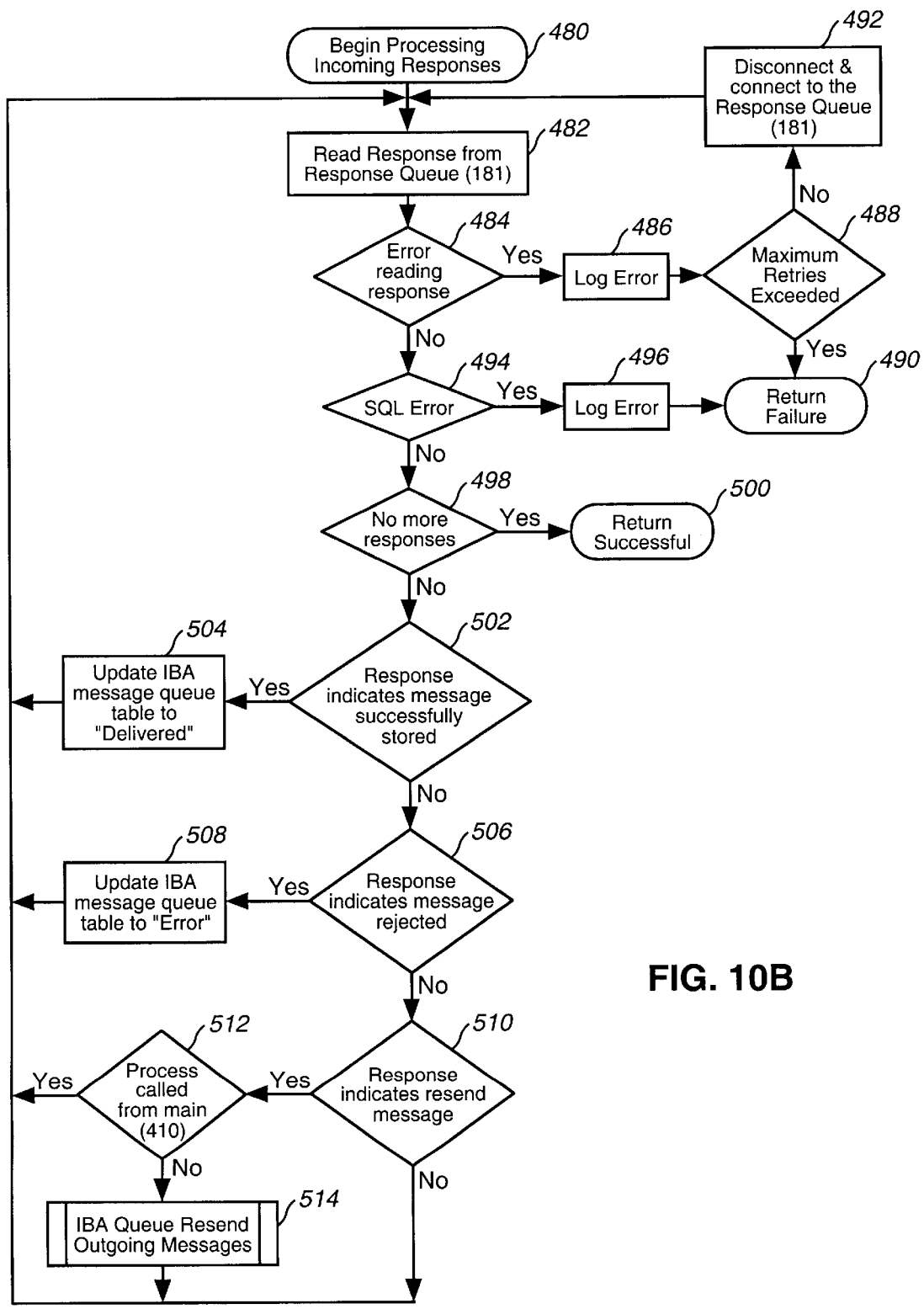

Turning now to FIG. 10B, the processing flow for IBA Queue Process Incoming Responses 410 and 468 will be described. This process is responsible for processing all responses found in the Response Queue 181 (FIG. 7), until an error occurs or there are no more responses. There are three different types of responses that may be received in Response Queue 181 (FIG. 7): a confirmation response, which indicates that the message sent to the IBAR Database 172 (FIG. 7) was successfully received and stored; a failure response, which indicates that the message was rejected; and a resend response, which requests that a specific message be resent.

The IBA Queue Process Queue Messages 410 and 468 begins in block 480 and a response is read from the Response Queue 181 (FIG. 7) in block 482. If an error occurred while reading the response, as determined in decision block 484, the error is logged in block 486. If the maximum number of retry attempts has been exceeded, as determined in decision block 488, a failure notification is returned in block 490. If, however, the maximum number of retry attempts has not been exceeded, the system disconnects and reconnects to the Response Queue 181 (FIG. 7) in block 492. Thereafter, processing loops back to attempt another read of the response from the Response Queue 181 (FIG. 7) in block 482. If, however, a successful read was performed, as determined in decision block 484, decision block 494 determines whether a SQL error has occurred. If a SQL error has occurred, the error is logged in decision block 496 and a failure notification is returned in block 490. If, however, a SQL error has not occurred, decision block 498 determines whether there are any more responses to be read from the Response Queue 181 (FIG. 7). If there are no more responses, a successful notification is returned in block 500.

If, however, there are more responses to be read, as determined in decision block 498, decision block 502 determines whether the response indicates that the message was successfully stored. If the message was successfully stored, the IBA message queue table is updated to "Delivered" in block 504 and processing loops back to read the next message from the Response Queue 181 (FIG. 7) in block 482. If, however, the message was not successfully stored, as determined in decision block 502, decision block 506 determines whether the response indicates that the message was rejected. If the message was rejected, the IBA message queue table is updated to "Error" in block 508 and processing loops back to read the next response from the Response Queue 181 (FIG. 7) in block 482. If, however, the message was not rejected, as determined in decision block 506, decision block 510 determines whether the response indicates that the message needs to be resent. If the message needs to be resent, decision block 512 determines whether this process was called from the main routine (FIG. 10, block 410). If this process was called from the main routine, processing loops back to read the next response from the Response Queue 181 (FIG. 7) in block 482. If, however, this process was not called from the main routine, as determined in decision block 512, the IBA Queue Resend Outgoing Message process is called in block 514. If the message does not need to be resent, as determined in decision block 510, or the IBA Queue Resend Outgoing Messages process 514 is complete, processing loops back to read the next response from the Response Queue 181 (FIG. 7) in block 482.

Figure 10C:
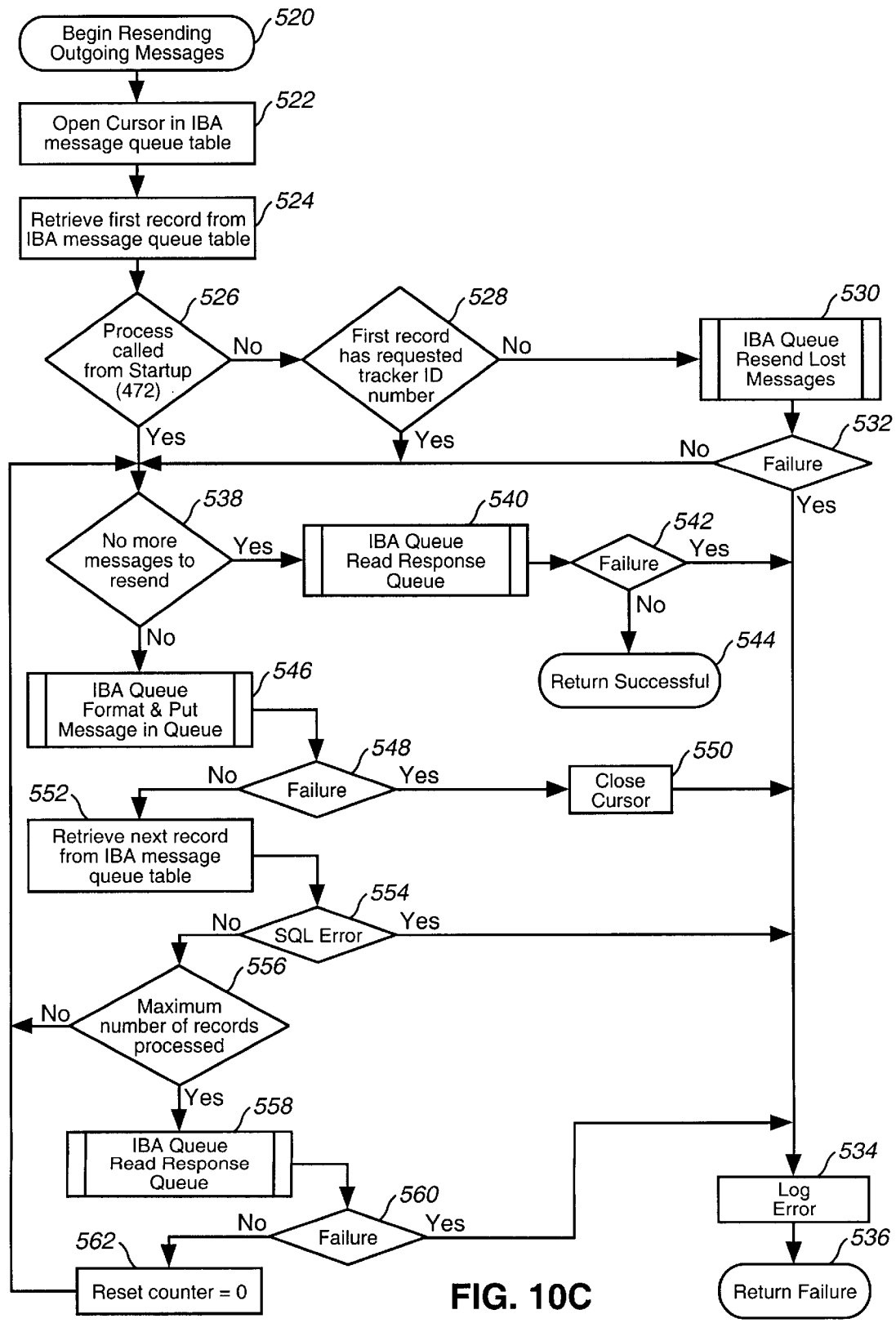

Turning now to FIG. 10C, the processing flow for IBA Queue Resend Outgoing Messages 414, 472 and 514 will be described. IBA Queue Resend Outgoing Messages 414, 472 and 514 is responsible for retrieving all messages with a tracker ID number greater or equal to a specific value within a specific range of status values and putting those messages onto the Message Queue 180 (FIG. 7).

IBA Queue Resend Outgoing Messages 414, 472 and 514 begins in block 520 and opens a cursor in the IBA message queue table for database access in block 522. Next, the first record from the IBA message queue table is retrieved in block 524. Decision block 526 determines if this process was called from the IBA Queue Start Process (FIG. 10A, block 472). If this process was not called from the IBA Queue Start Process, decision block 528 determines if the first record retrieved has the requested tracker ID number. If the first record retrieved does not have the requested tracker ID number, the IBA Queue Resend Lost Message process is called in block 530. The IBA Queue Resend Lost Message process 530 will be described below in reference to FIG. 10G. If the IBA Queue Resend Lost Message process 530 failed, as determined in decision block 532, the error is logged in block 534 and a failure notification is returned in block 536. If, however, the IBA Queue Resend Messages process 530 was not called from the startup process, as determined in decision block 526, or the first record retrieved did have the requested tracker ID number, as determined in decision block 528, or the IBA Queue Resend Lost Messages process 530 did not fail, as determined in decision block 532, decision block 538 then determines whether there are any more messages to be re-sent. If there are no more messages to be re-sent, IBA Queue Read Response Queue is called in block 540. The IBA Queue Read Response Queue process 540 will be described below in reference to FIG. 10F. If the IBA Queue Read Response Queue process 540 did not fail, as determined in decision block 542, a successful notification is returned in block 544. If, however, the IBA Queue Read Response Queue process 540 failed, the error is logged in block 534 and a failure notification is returned in block 536.

If there are more messages to be re-sent, as determined in decision block 538, the IBA Queue Format & Put Message in Queue process is called in block 546. The IBA Queue Format & Put Message in Queue process 546 will be described below in reference to FIG. 10E. If the IBA Queue Format & Put Message in Queue process 546 failed, as determined in decision block 548, the IBA message queue table cursor is closed in block 550, the error is logged in block 534 and a failure notification is returned in block 536. If, however, the IBA Queue Format & Put Message in Message Queue process 546 did not fail, the next record is retrieved from the IBA message queue table in block 552. If an SQL error has occurred, as determined in decision block 554, the error is logged in block 534 and a failure notification is returned in block 536. If, however, an SQL error has not occurred, decision block 556 determines whether the maximum number of records have been processed. If the maximum number of records have not been processed, processing loops back to decision block 538 to determine whether there are any more messages to be re-sent. If, however, the maximum number of records have not been processed, as determined in decision block 556, the IBA Queue Read Response Queue process is called in block 558. The IBA Queue Read Response Queue process 558 will be described below in reference to FIG. 10F. If the IBA Queue Read Response Queue process 558 did not fail, as determined in decision block 560, the message counter is reset to zero in block 562 and processing loops back to decision block 538 to determine whether there are any more messages to be re-sent. If, however, the IBA Queue Read Response Queue process 558 failed, the error is logged in block 534 and a failure notification is returned in block 536.

Figure 10D:
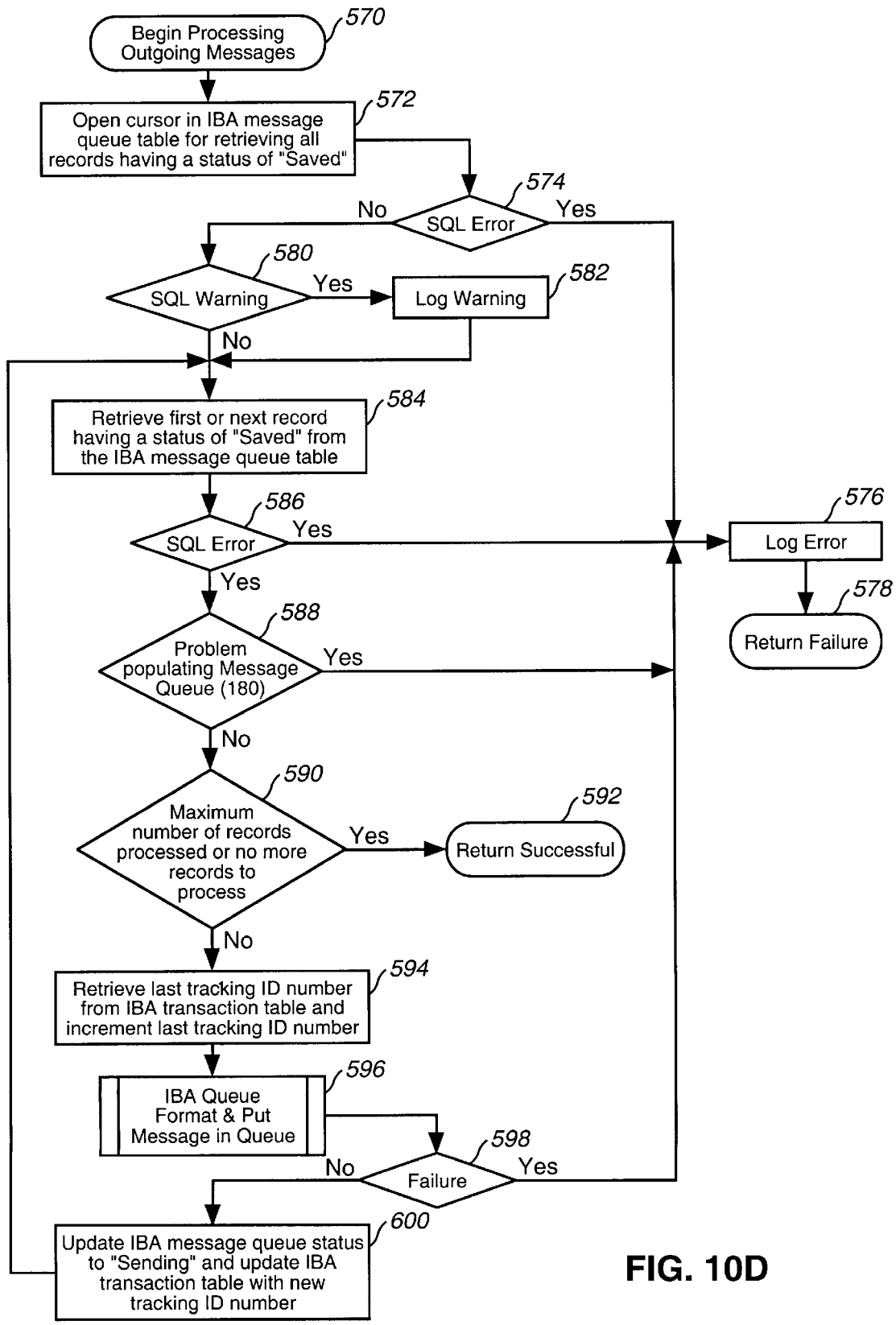

Turning now to FIG. 10D, the processing flow for the IBA Queue Process Outgoing Messages 416 will be described. IBA Queue Process Outgoing Messages 416 is responsible for processing all saved records in the RIBA Database 144 (FIG. 7). This process opens a cursor in the IBA message queue table and for each record retrieved, tags the message with a newly generated tracker ID number, formats the message and puts a message in the Message Queue 180 (FIG. 7). This process continues to retrieve records and tag, format and put the messages in the Message Queue 180 (FIG. 7) until a configurable number of records have been processed, or until there are no more records to be processed, or an error occurs. In addition, the IBA message queue status of each message is updated to "Sending."

Processing begins in block 570 and a cursor is opened in the IBA message queue table for retrieving all records having a status of "Saved" from the RIBA Database 144 (FIG. 7) in block 572. If an SQL error has occurred, as determined in decision block 574, the error is logged in block 576 and a failure notification is returned in block 578. If an SQL error has not occurred, but an SQL warning has occurred, as determined in decision block 580, the warning is logged in block 582. If an SQL warning has not occurred, or the warning has been logged in block 582, the first record is retrieved having a status of "Saved" from the IBA message queue table in block 584. If an SQL error has occurred, as determined in decision block 586, the error is logged in block 576 and a failure notification is returned in block 578. If a SQL error has not occurred, decision block 588 determines whether there is a problem populating the Message Queue 180 (FIG. 7). If there is a problem populating the Message Queue 180 (FIG. 7), the error is logged in block 576 and a failure notification is returned in block 578. If there is not a problem populating the Message Queue 180 (FIG. 7), as determined in decision block 588, decision block 590 determines whether the maximum number of records have been processed or there are no more records to process. If the maximum number of records have been processed or there are no more records to process, a successful notification is returned in block 592. If, however, the maximum number of records have not been processed and there are more records to process, as determined in decision block 590, the last tracking ID number is retrieved from the IBA transaction table and the last tracking ID number is incremented in block 594. Next, the Format Put Message in Message Queue process begins in block 596. The Format and Put Message in Queue process 596 will be described below in reference to FIG. 10E. If the Format Put Message in Queue process 596 failed, as determined in decision block 598, the error is logged in block 576 and a failure notification is returned in block 578. If, however, the Format and Put Message in Queue process 596 did not fail, the IBA message queue status is updated to "Sending" and the IBA transaction table is updated with the new tracker ID number in block 600 and processing loops back to retrieve another record from the IBA message queue table in block 584.

Figure 10E:
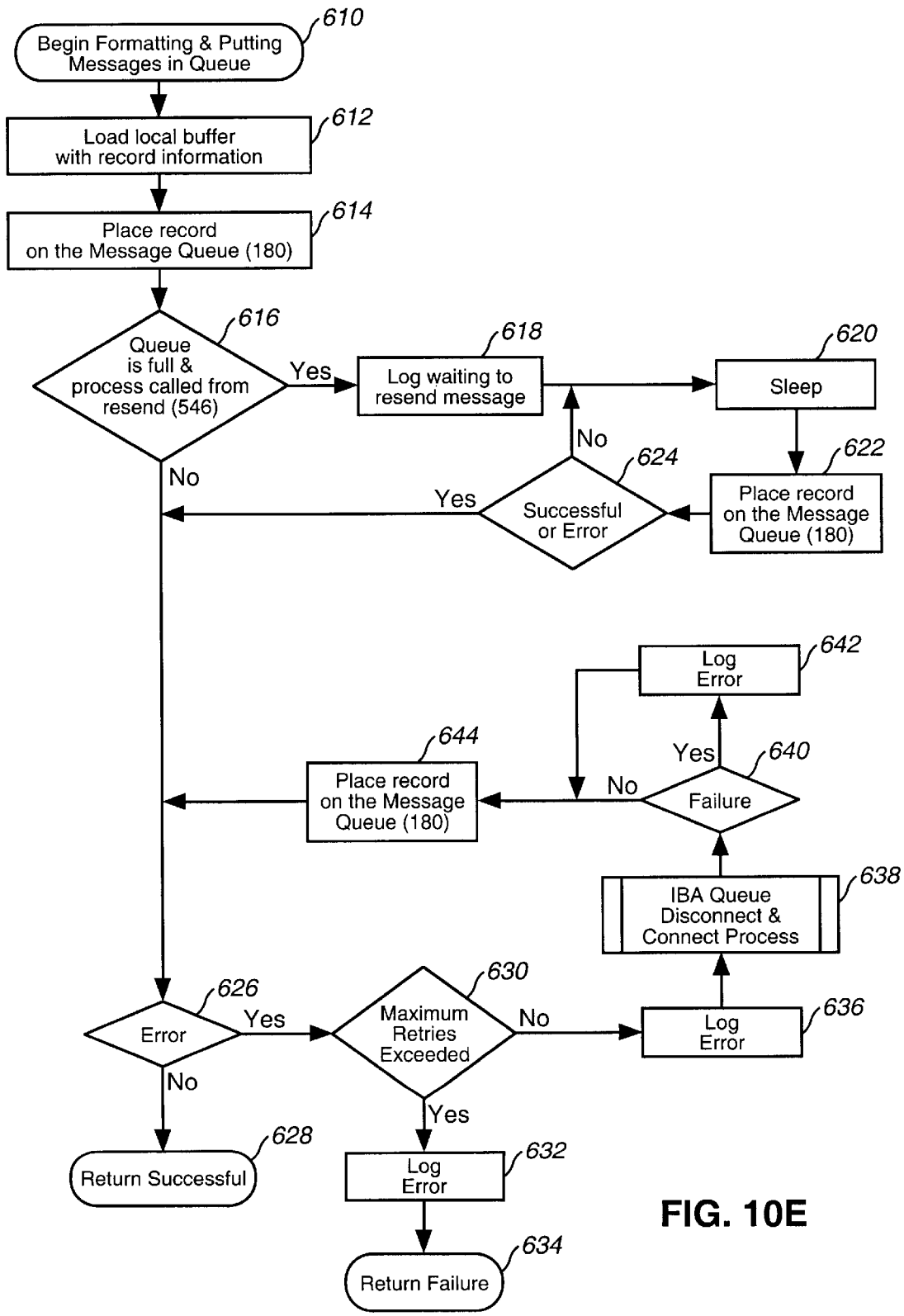

Turning now to FIG. 10E, the processing flow for the IBA Queue Format & Put Message in Queue process 546 and 596 will be described. The IBA Queue Format & Put Message in Queue process 546 and 596 is responsible for formatting and placing a message in the Message Queue 180 (FIG. 7). One message may be placed on the Message Queue 180 (FIG. 7) each time the IBA Queue Format & Put Message in Queue process 546 and 596 is called.

The IBA Queue Format & Put Message in Queue process 546 and 596 begins in block 610 and the local buffer is loaded with the record information passed to the process in block 612. Next, the record is placed on the Message Queue 180 (FIG. 7) in block 614. If the Message Queue 180 (FIG. 7) is full or the process was called from the Resend Outgoing Messages process (FIG. 10C, block 546), as determined in decision block 616, a message is logged in block 618 indicating that the system is waiting to resend the record because the Message Queue 180 (FIG. 7) is full. Thereafter, the process sleeps for a configured amount of time in block 620 and the record is again placed on the Message Queue 180 (FIG. 7) in block 622. If the record was not successfully placed on the Message Queue 180 (FIG. 7) and an error has not occurred, as determined in decision block 624, the process loops back to block 620 and sleeps for a configured amount of time. If, however, the record was successfully placed on the Message Queue 180 (FIG. 7) or an error occurred, or the Message Queue 180 (FIG. 7) was not fill or the process was not called from the Resend Outgoing Messages Process (FIG. 10C, block 546), as determined in decision block 616, decision block 626 determines whether an error has occurred. If an error has not occurred, a successful notification is returned in block 628. If, however, an error has occurred, as determined in decision block 626, decision block 630 determines whether the maximum number of retry attempts have been exceeded. If the maximum number of retry attempts have been exceeded, the error is logged in block 632 and a failure notification is returned in block 634. If, however, the maximum number of retry attempts have not been exceeded, the error is logged in block 636 and the IBA Queue Disconnect & Connect Process is called in block 638 to reset the queue connections. The IBA Queue Disconnect & Connect Process 638 will be described below in reference to FIG. 10J. If the IBA Queue Disconnect & Connect Process 638 failed, as determined in decision block 640, the error is logged in block 642. If, however, the IBA Queue Disconnect & Connect Process 638 did not fail, or the error has been logged in block 642, the record is placed on the Message Queue 180 (FIG. 7) in block 644. Next, processing loops back to decision block 626 to determine whether an error has occurred.

Figure 10F:
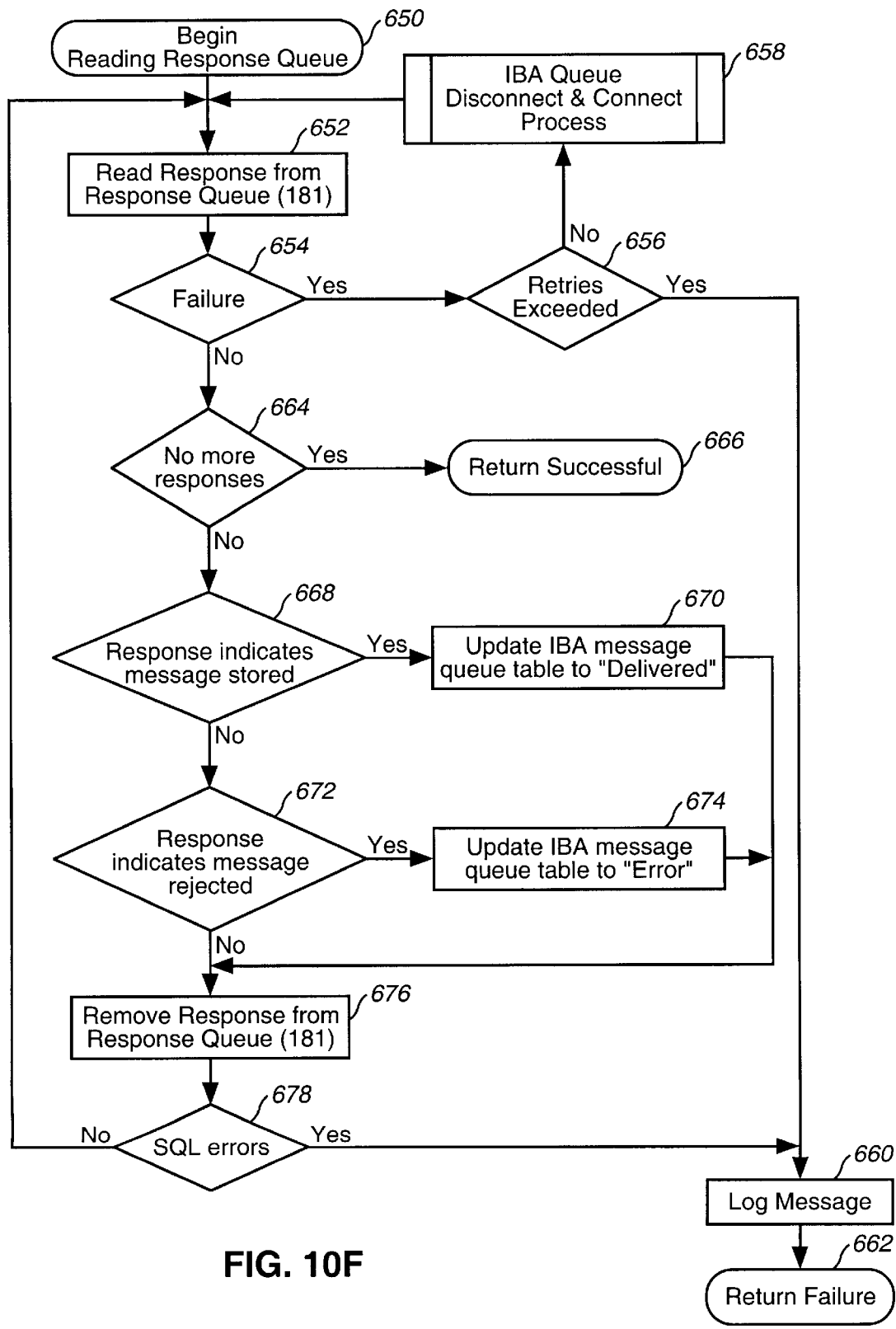

Turning now to FIG. 10F, the processing flow for the IBA Queue Read Response Queue 540 and 558 will be described. The IBA Queue Read Response Queue 540 and 558 is responsible for processing all responses found in Response Queue 181 (FIG. 7). The IBA Queue Read Response Queue process 540 and 558 begins in block 650 and reads a response from the Response Queue 181 (FIG. 7) in block 652. Decision block 654 determines if the read failed. If the read failed, decision block 656 determines whether the maximum number of retry attempts have been exceeded. If the maximum number of retry attempts have not been exceeded, the IBA Queue Disconnect & Connect Process is called in block 658 and processing loops back to block 652 where the response is again read from the Response Queue 181 (FIG. 7). The IBA Queue Disconnect & Connect Process 658 will be described below in reference to FIG. 10J. If, however, the maximum number of retry attempts have been exceeded, as determined in decision block 656, the error is logged in block 660 and a failure notification is returned in block 662.

If the read did not fail, as determined in decision block 654, decision block 664 determines whether there are any more responses to process. If there are no more responses to process, a successful notification is returned in block 666. If, however, there are more responses to process, as determined in decision block 664, decision block 668 determines whether the response indicates that the message was successfully stored in the IBAR Database 172 (FIG. 7). If the response indicates that the message was successfully stored in the IBAR Database 172 (FIG. 7), the IBA message queue table status is updated to "Delivered" in block 670. If, however, the response does not indicate that the message was successfully stored, as determined in decision block 668, decision block 672 determines if the response indicates that the message was rejected from the IBAR Database 172 (FIG. 7). If the response indicates that the message was rejected, the IBA message queue table status is updated to "Error" in block 674. If the response does not indicate that the message was rejected, as determined in decision block 672, or the IBA message queue table has been updated in block 670 or block 674, the response is removed from the Response Queue 181 (FIG. 7) in block 676. Next, decision block 678 determines if any SQL errors have occurred. If a SQL error has occurred, the error is logged in block 660 and a failure notification is returned in block 662. If, however, no SQL errors have occurred, as determined in decision block 678, processing returns to block 652 where the next response is read from the Response Queue 181 (FIG. 7).

Figure 10G:
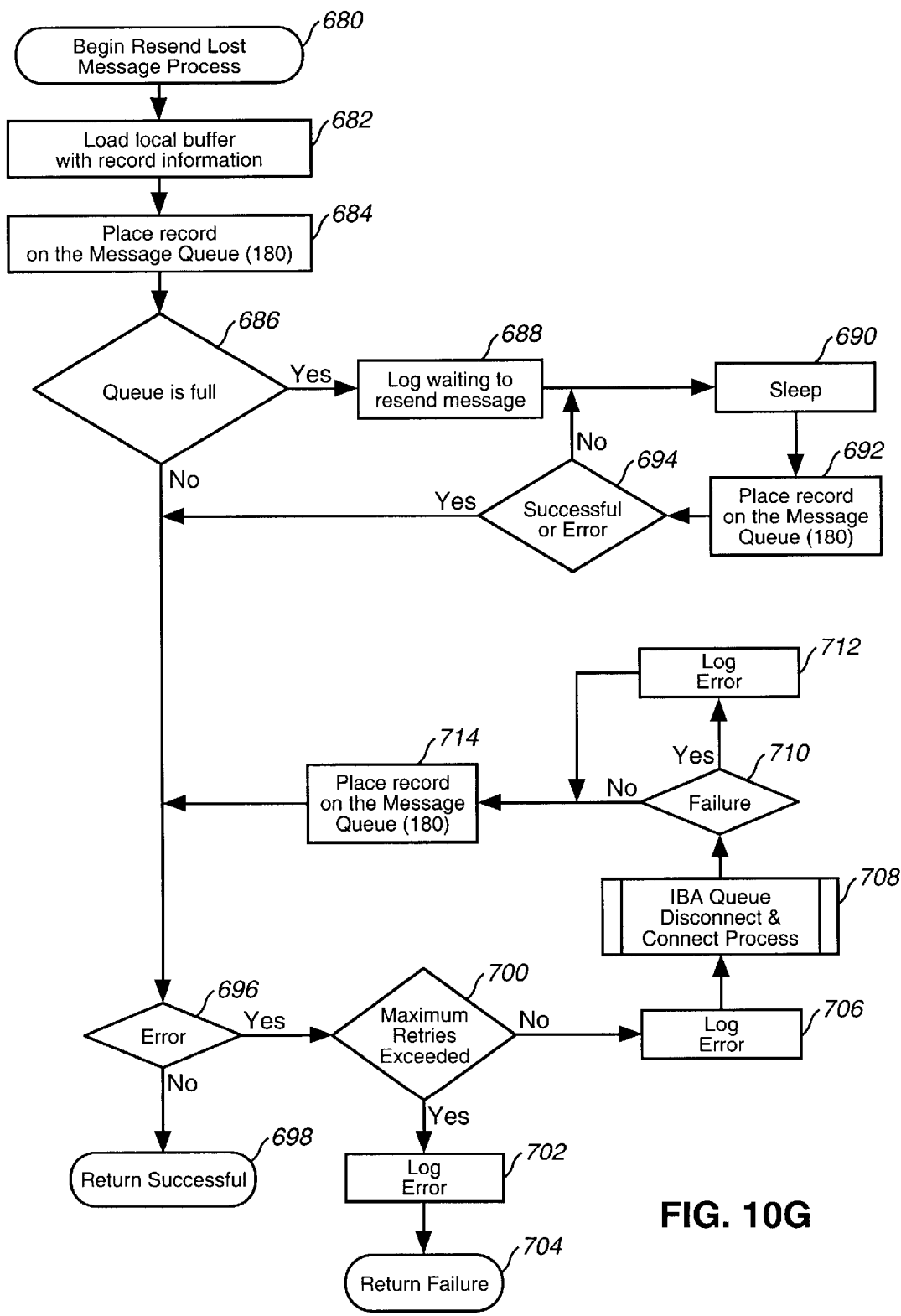

Turning now to FIG. 10G, the processing flow for the IBA Queue Resend Lost Message process 530 will be described. The IBA Queue Resend Lost Message process 530 is responsible for formatting and placing a lost message on the Message Queue 180 (FIG. 7) and is very similar to the IBA Format & Put Message in Queue process 546 and 596 described in reference to 10E. Only one message is placed on the Message Queue 180 (FIG. 7) each time the process 530 is called.

The IBA Queue Resend Lost Message process 530 begins in block 680 and the local buffer is loaded with the record information passed to the process in block 682. Next, the record is placed on the Message Queue 180 (FIG. 7) in block 684. If the Message Queue 180 (FIG. 7) is full, as determined in decision block 686, a message is logged in block 688 indicating the system is waiting to resend the record because the Message Queue 180 (FIG. 7) is full. Thereafter, the process sleeps for a configured amount of time in block 690 and the record is again placed on the Message Queue 180 (FIG. 7) in block 692. If the record was not successfully placed on the Message Queue 180 (FIG. 7) and an error has not occurred, as determined in decision block 694, the process loops back to block 690 and sleeps for a configured amount of time. If, however, the record was successfully placed on the Message Queue 180 (FIG. 7) or an error occurred, or the Message Queue 180 (FIG. 7) was not full, as determined in decision block 686, decision block 696 determines whether an error has occurred. If an error has not occurred, a successful notification is returned in block 698. If, however, an error has occurred, as determined in decision block 696, decision block 700 determines whether the maximum number of retry attempts have been exceeded. If the maximum number of retry attempts have been exceeded, the error is logged in block 702 and a failure notification is returned in block 704. If, however, the maximum number of retry attempts have not been exceeded, an error is logged in block 706 and the IBA Queue Disconnect & Connect Process is called in block 708 to reset the queue connections. The IBA Queue Disconnect & Connect Process 708 will be described below in reference to FIG. 10J. If the IBA Queue Disconnect & Connect Process 708 failed, as determined in decision block 710, the error is logged in block 712. If, however, the IBA Queue Disconnect & Connect Process 708 did not fail, or the error has been logged in block 712, the record is placed on the Message Queue 180 (FIG. 7) in block 714. Next, processing loops back to decision block 696 to determine whether an error has occurred.

Figure 10H:
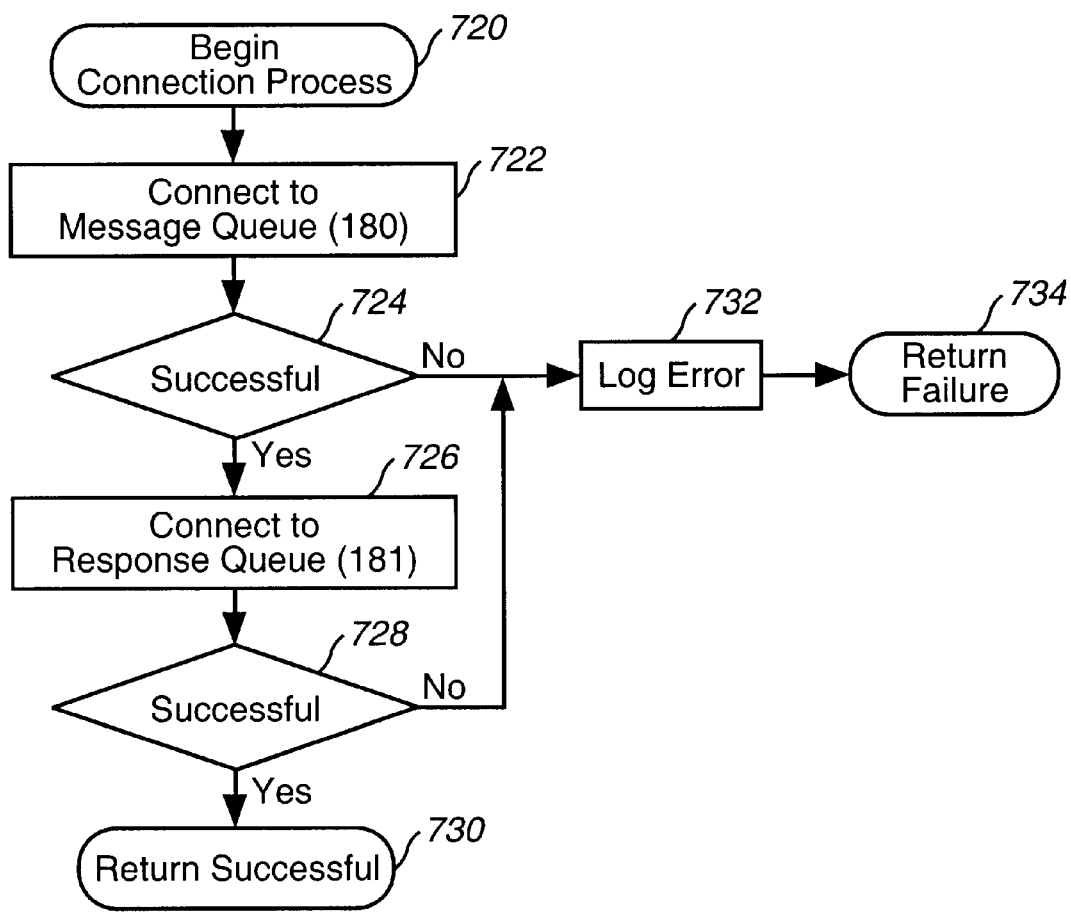

Turning now to FIG. 10H, the processing flow for the IBA Queue Connect Process 464 will be described. The IBA Queue Connect Process 464 is responsible for connecting to the Message Queue 180 (FIG. 7) and Response Queue 181 (FIG. 7).

The process begins in block 720 and a connection is made to the Message Queue 180 (FIG. 7) in block 722. If the connection was successfully made, as determined in decision block 724, a connection is made to the Response Queue 181 (FIG. 7) in block 726. If the connection was successfully made, as determined in decision block 728, a successful notification is returned in block 730. If, however, the connection to the Message Queue 180 (FIG. 7) was not successfully made, as determined in decision block 724, or the connection to the Response Queue 181 (FIG. 7) was not successfully made, as determined in decision block 728, the error is logged in block 732 and a failure notification is returned in block 734.

Figure 10I:
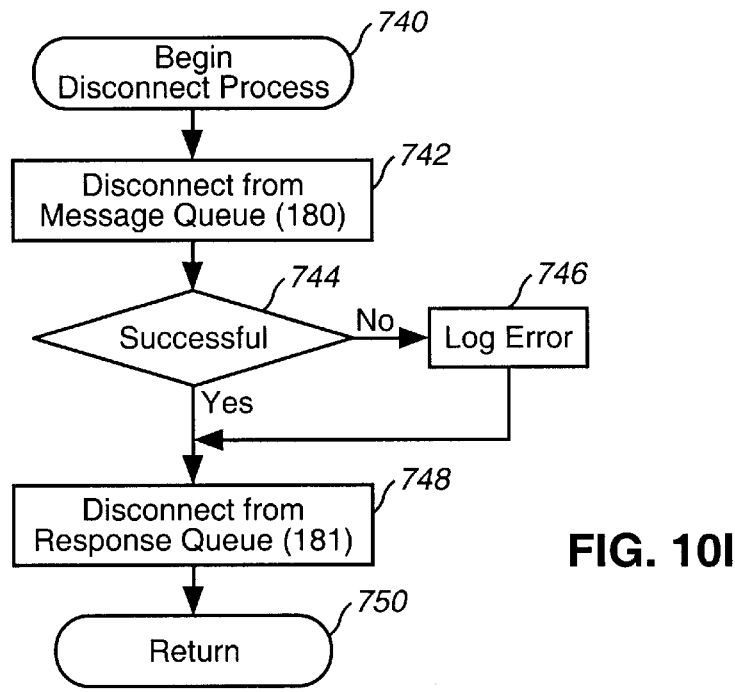

Turning now to FIG. 10I, the processing flow for the IBA Queue Disconnect Process 408 will be described. The IBA Queue Disconnect Process 408 is responsible for disconnecting from the Message and Response Queues 180 and 181 (FIG. 7). The process begins in block 740 and the process disconnects from the Message Queue 180 (FIG. 7) in block 742. If the disconnect was not successful, the error is logged in block 746. If, however, the disconnect was successful, as determined in decision block 744, or the error has been logged in block 746, the process disconnects from the Response Queue 181 (FIG. 7) in block 748. Thereafter, processing returns to the calling process in block 750.

Figure 10J:
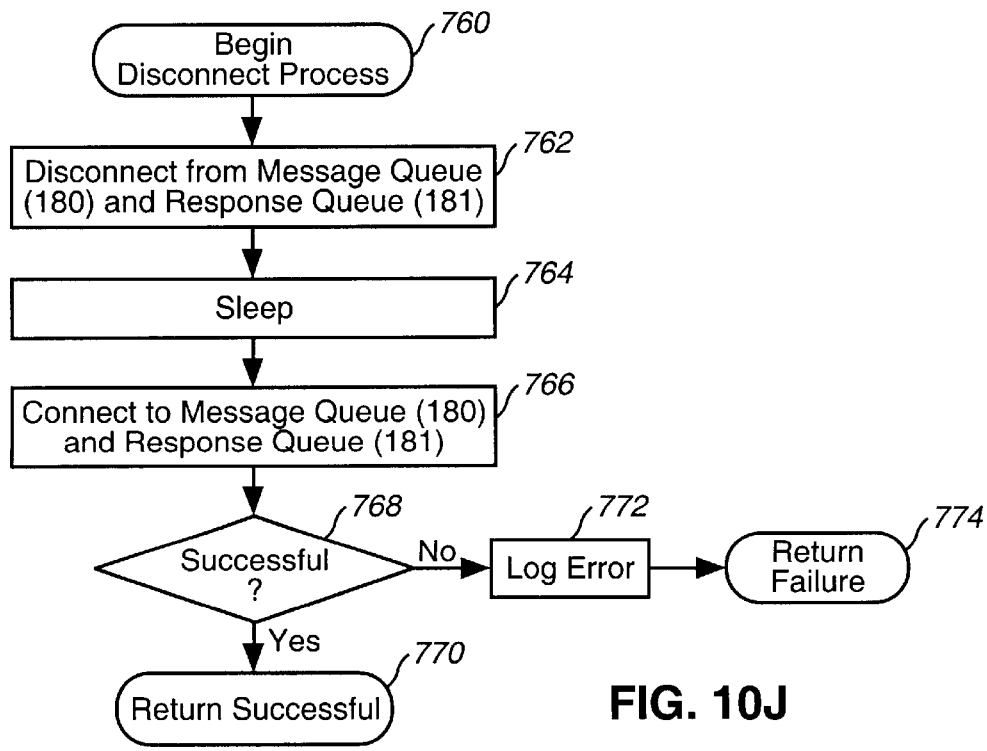

Turning now to FIG. 10J, the processing flow for the IBA Queue Disconnect & Connect Process 638, 658 and 708 will be described. The IBA Queue Disconnect & Connect Process 638, 658 and 708 is responsible for resetting the connections to the Message and Response Queues 180 and 181 (FIG. 7). Processing begins in block 760 and the Message and Response Queues 180 and 181 (FIG. 7) are disconnected in block 762. The process then sleeps for a configured amount of time in block 764 and a connection is made to the Message and Response Queues 180 and 181 (FIG. 7) in block 766. If the connections were successful, as determined in decision block 768, a successful notification is returned in block 770. If, however, the connections were unsuccessful, the error is logged in block 772 and a failure notification is returned in block 774.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. A method for processing data records from a telephone data repository to a receiving system having a message queue and a response queue, the method for processing data records comprising the steps of:

(a) reading a response from the response queue and whenever the response is successfully read, processing the response;

(b) repeating step (a) until there are no more responses to be read;

(c) retrieving a data record from the telephone data repository and whenever the data record is successfully retrieved, formatting the data record into a message and putting the message in the message queue; and (d) repeating step (c) until a specified number of data records have been retrieved or there are no more data records to be retrieved.

2. The method for processing data records as recited in claim 1, further comprising the step of repeating steps (a), (b), (c) and (d) until a terminate signal is received.

3. The method for processing data records as recited in claim 1, wherein the response corresponds to a previously sent message.

4. The method for processing data records as recited in claim 3, wherein the response indicates a status of the previously sent message and step (a) includes updating a message queue table to indicate the status of the previously sent message.

5. The method for processing data records as recited in claim 4, wherein the status indicates that the previously sent message was successfully stored in the receiving system.

6. The method for processing data records as recited in claim 4, wherein the status indicates that the previously sent message was rejected by the receiving system.

7. The method for processing data records as recited in claim 4, wherein the status indicates that the previously sent message should be resent to the receiving system.

8. The method for processing data records as recited in claim 3, wherein step (a) includes resending the previously sent message whenever the response indicates that the previously sent message should be resent to the receiving system.

9. The method for processing data records as recited in claim 1, wherein the data records retrieved in step (c) have a specific status.

10. The method for processing data records as recited in claim 1, further comprising the steps of:

(b.1) retrieving a previously sent data record from the telephone data repository and whenever the previously sent data record is successfully retrieved, formatting the previously sent data record into a resend message and putting the resend message in the message queue; and (b.2) repeating step (b.1) until there are no more previously sent data records to be retrieved.

11. The method for processing data records as recited in claim 10, further comprising the steps of:

(b.1.1) whenever a specified number of previously sent data records have been retrieved, reading the response from the response queue and whenever the response is successfully read, processing the response and removing the response from the response queue; and (b.1.2) repeating step (b.1.1) until there are no more responses to be read.

12. The method for processing data records as recited in claim 11, wherein steps (b.1.1) and (b.1.2) are invoked only if a specified amount of time has elapsed without invoking step (c).

13. The method for processing data records as recited in claim 1, wherein step (c) further comprises assigning a tracking number to the message and recording the data record and tracking number in a message status file.

14. The method for processing data records as recited in claim 13, further comprising updating the message status file based on a current status of the message.

15. The method for processing data records as recited in claim 1, wherein the data record comprises telephone porting data that defines how to route a call from a first service provider to a second service provider.

16. The method for processing data records as recited in claim 1, wherein the data record comprises a change in the telephone data repository.

17. The method for processing data records as recited in claim 1, wherein the data record comprises:
telephone network data; and
subscription information.

18. The method for processing data records as recited in claim 1, wherein the data record comprises an activated telephone number.

19. The method for processing data records as recited in claim 1, wherein the data record comprises a deactivated telephone number.

20. The method for processing data records as recited in claim 1, wherein the data record comprises a modified telephone number.

21. The method for processing data records as recited in claim 1, wherein the data record comprises a local number portability request.

22. The method for processing data records as recited in claim 1, further comprising the step of connecting to the telephone data repository, the message queue and the response queue.

23. The method for processing data records as recited in claim 1, further comprising the step of disconnecting from the telephone data repository, the message queue and the response queue.

24. A method for processing data records from a telephone data repository to a receiving system having a message queue and a response queue, the method for processing data records comprising the steps of:

(a) reading a response from the response queue and whenever the response is successfully read, processing the response;

(b) repeating step (a) until there are no more responses to be read;

(c) whenever a specified amount of time has elapsed without invoking step (d):

(c.1) retrieving a previously sent data record from the telephone data repository and whenever the previously sent data record is successfully retrieved, formatting the previously sent data record into a resend message and putting the resend message in the message queue;

(c.2) whenever a specified number of previously sent data records have been retrieved, reading the response from the response queue and whenever the response is successfully read, processing the response and removing the response from the response queue;

(c.3) repeating step (c.2) until there are no more responses to be read;

(c.4) repeating steps (c.1), (c.2) and (c.3) until there are no more previously sent data records to be retrieved;

(d) retrieving a data record from the telephone data repository and whenever the data record is successfully retrieved, formatting the data record into a message and putting the message in the message queue;

(e) repeating step (d) until a specified number of data records have been retrieved or there are no more data records to be retrieved; and (f) repeating steps (a), (b), (c), (d) and (e) until a terminate signal is received.

25. The method for processing data records as recited in claim 24, wherein the response corresponds to a previously sent message.

26. The method for processing data records as recited in claim 25, wherein the response indicates a status of the previously sent message and step (a) includes updating a message queue table to indicate the status of the previously sent message.

27. The method for processing data records as recited in claim 26, wherein the status indicates that the previously sent message was successfully stored in the receiving system.

28. The method for processing data records as recited in claim 26, wherein the status indicates that the previously sent message was rejected by the receiving system.

29. The method for processing data records as recited in claim 26, wherein the status indicates that the previously sent message should be resent to the receiving system.

30. The method for processing data records as recited in claim 25, wherein step (a) includes resending the previously sent message whenever the response indicates that the previously sent message should be resent to the receiving system.

31. The method for processing data records as recited in claim 24, wherein the data records retrieved in step (d) have a specific status.

32. The method for processing data records as recited in claim 24, wherein step (d) further comprises assigning a tracking number to the message and recording the data record and tracking number in a message status file.

33. The method for processing data records as recited in claim 32, further comprising updating the message status file based on a current status of the message.

34. The method for processing data records as recited in claim 24, wherein the data record comprises telephone porting data that defines how to route a call from a first service provider to a second service provider.

35. The method for processing data records as recited in claim 24, wherein the data record comprises a change in the telephone data repository.

36. The method for processing data records as recited in claim 24, wherein the data record comprises:

telephone network data; and subscription information.

37. The method for processing data records as recited in claim 24, wherein the data record comprises an activated telephone number.

38. The method for processing data records as recited in claim 24, wherein the data record comprises a deactivated telephone number.

39. The method for processing data records as recited in claim 24, wherein the data record comprises a modified telephone number.

40. The method for processing data records as recited in claim 24, wherein the data record comprises a local number portability request.

41. The method for processing data records as recited in claim 24, further comprising the step of connecting to the telephone data repository, the message queue and the response queue.

42. The method for processing data records as recited in claim 24, further comprising the step of disconnecting from the telephone data repository, the message queue and the response queue.

43. A data record processing system comprising:

a data processor;

a first communications link connecting the data processor to a telephone data repository;

a second communications link connecting the data processor to a message queue;

a third communications link connecting the data processor to a response queue;

the message queue and response queue being connected to a receiving system; and the data processor being configured to retrieve a data record from the telephone data repository via the first communications link, format the data record into a message and send the message to the message queue via the second communications link.

44. The system as recited in claim 43, wherein the data record comprises telephone porting data defining how to route a call from a first service provider to a second service provider.

45. The system as recited in claim 43, wherein the data record comprises:

telephone network data; and subscription information.

46. The system as recited in claim 43, wherein the data record comprises an activated telephone number.

47. The system as recited in claim 43, wherein the data record comprises a deactivated telephone number.

48. The system as recited in claim 43, wherein the data record comprises a modified telephone number.

49. The system as recited in claim 43, wherein the data record comprises a local number portability request.

50. The system as recited in claim 43, further comprising an application for updating an internal transaction table in the telephone data repository to reflect a current status of the data record.

* * * * *